(12) United States Patent
Du

(10) Patent No.: US 12,387,588 B2
(45) Date of Patent: Aug. 12, 2025

(54) HEARING AIDING APPARATUS INTEGRATING IMAGE-ACOUSTICS POSITIONING, OMNIDIRECTIONAL ACOUSTIC RECEPTION, AND WARNING

(71) Applicant: NATIONAL CHENG KUNG UNIVERSITY, Tainan (TW)

(72) Inventor: Yi-Chun Du, Tainan (TW)

(73) Assignee: National Cheng Kung University, Tainan (TW)

( * ) Notice: Subject to any disclaimer, the term of this patent is extended or adjusted under 35 U.S.C. 154(b) by 311 days.

(21) Appl. No.: 18/337,820

(22) Filed: Jun. 20, 2023

(65) Prior Publication Data
US 2024/0177588 A1 May 30, 2024

(30) Foreign Application Priority Data
Nov. 25, 2022 (TW) .................................. 111145244

(51) Int. Cl.
*H04R 25/00* (2006.01)
*G06V 40/16* (2022.01)
(Continued)

(52) U.S. Cl.
CPC ........... *G08B 21/18* (2013.01); *G06V 40/172* (2022.01); *G10L 25/51* (2013.01); *H04N 23/57* (2023.01); *H04N 23/611* (2023.01); *H04N 23/67* (2023.01); *H04N 23/90* (2023.01); *H04R 25/405* (2013.01); *H04R 25/407* (2013.01); *H04R 25/554* (2013.01); *H04R 25/604* (2013.01); *G10L 17/00* (2013.01); *H04R 2225/43* (2013.01)

(58) Field of Classification Search
CPC .. H04R 1/406; H04R 2225/43; H04R 25/405; H04R 25/407; H04R 25/554; H04R 25/604; H04R 3/005; H04N 23/57; H04N 23/611; H04N 23/67; H04N 23/90; G06V 40/172; G10L 17/00; G10L 25/51
USPC .......................................................... 381/313
See application file for complete search history.

(56) References Cited

U.S. PATENT DOCUMENTS

| | | | |
|---|---|---|---|
| 10,248,856 B2 * | 4/2019 | Moore | G06V 20/20 |
| 2012/0116184 A1 * | 5/2012 | Shieh | A61B 5/01 600/301 |

(Continued)

*Primary Examiner* — Phylesha Dabney
(74) *Attorney, Agent, or Firm* — Rosenberg, Klein & Lee

(57) ABSTRACT

A hearing aiding apparatus integrating image-acoustics positioning, omnidirectional acoustic reception, and warning includes an apparatus body, an acoustic-receiving unit, an image-capturing unit, a warning device, and a control unit. The apparatus body has a playing unit. The acoustic-receiving unit captures audio signals around the apparatus body in a 360-degree range. The audio signals include ambient sounds and speaking voices. The image-capturing unit captures human-face images around the apparatus body. The control unit stores human-face images, speaking voices, and special ambient sound audios. The control unit receives the audio signals and the human-face images and uses computer vision to identify and enhance the speaking voices associated with the human-face images. Then the playing unit plays the speaking voices. The control unit issues a warning message via the warning device when receiving an ambient sound identical to a pre-stored special ambient sound.

10 Claims, 18 Drawing Sheets

(51) Int. Cl.
　　　　*G08B 21/18*　　　(2006.01)
　　　　*G10L 25/51*　　　(2013.01)
　　　　*H04N 23/57*　　　(2023.01)
　　　　*H04N 23/611*　　 (2023.01)
　　　　*H04N 23/67*　　　(2023.01)
　　　　*H04N 23/90*　　　(2023.01)
　　　　*G10L 17/00*　　　(2013.01)

(56) References Cited

U.S. PATENT DOCUMENTS

2015/0196101 A1* 7/2015 Dayal ................ G01C 21/3602
　　　　　　　　　　　　　　　　　　　　　　　 63/1.11
2017/0032787 A1* 2/2017 Dayal .................... G06F 3/167
2019/0028817 A1* 1/2019 Gabai .................. H04R 25/407

* cited by examiner

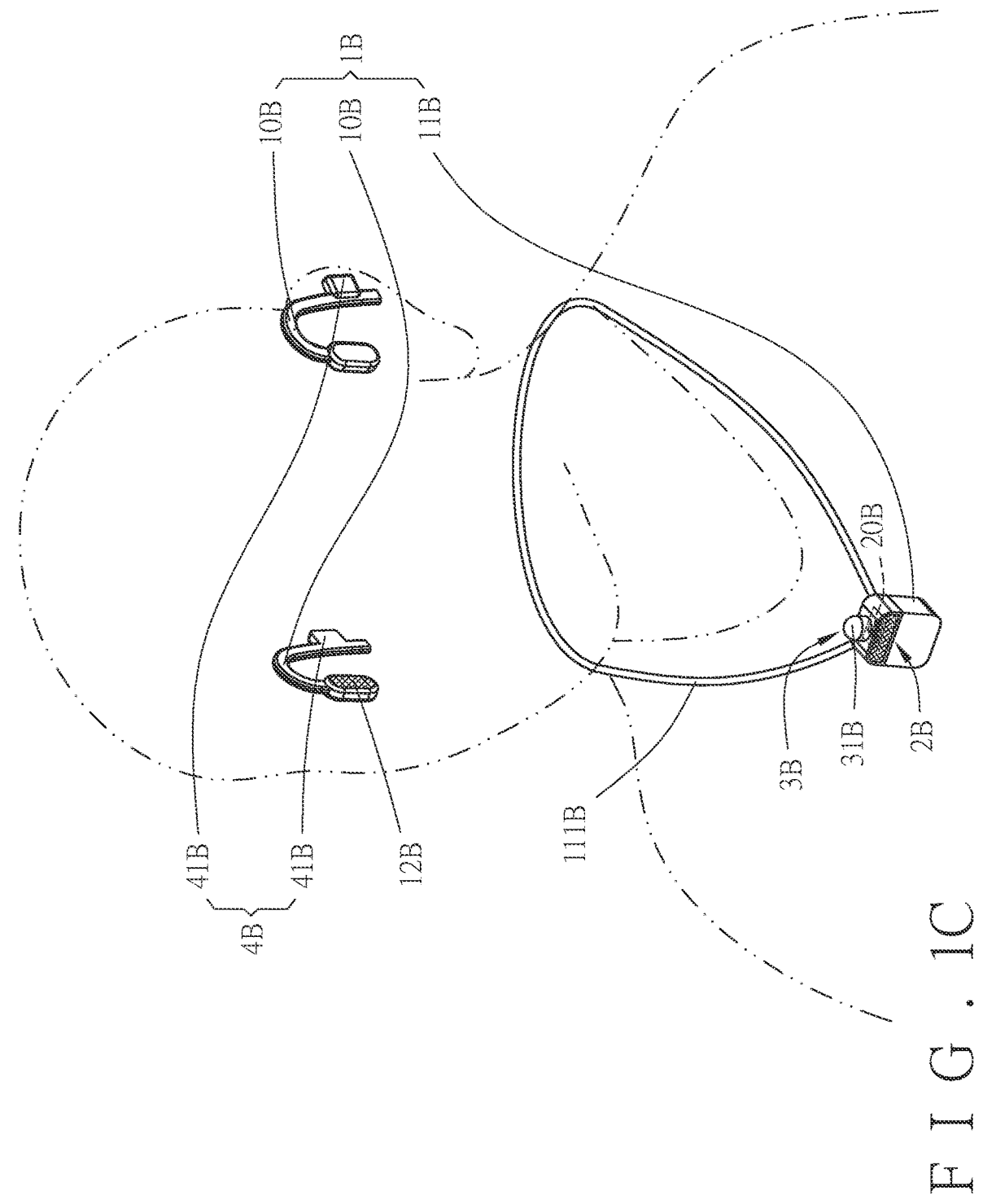

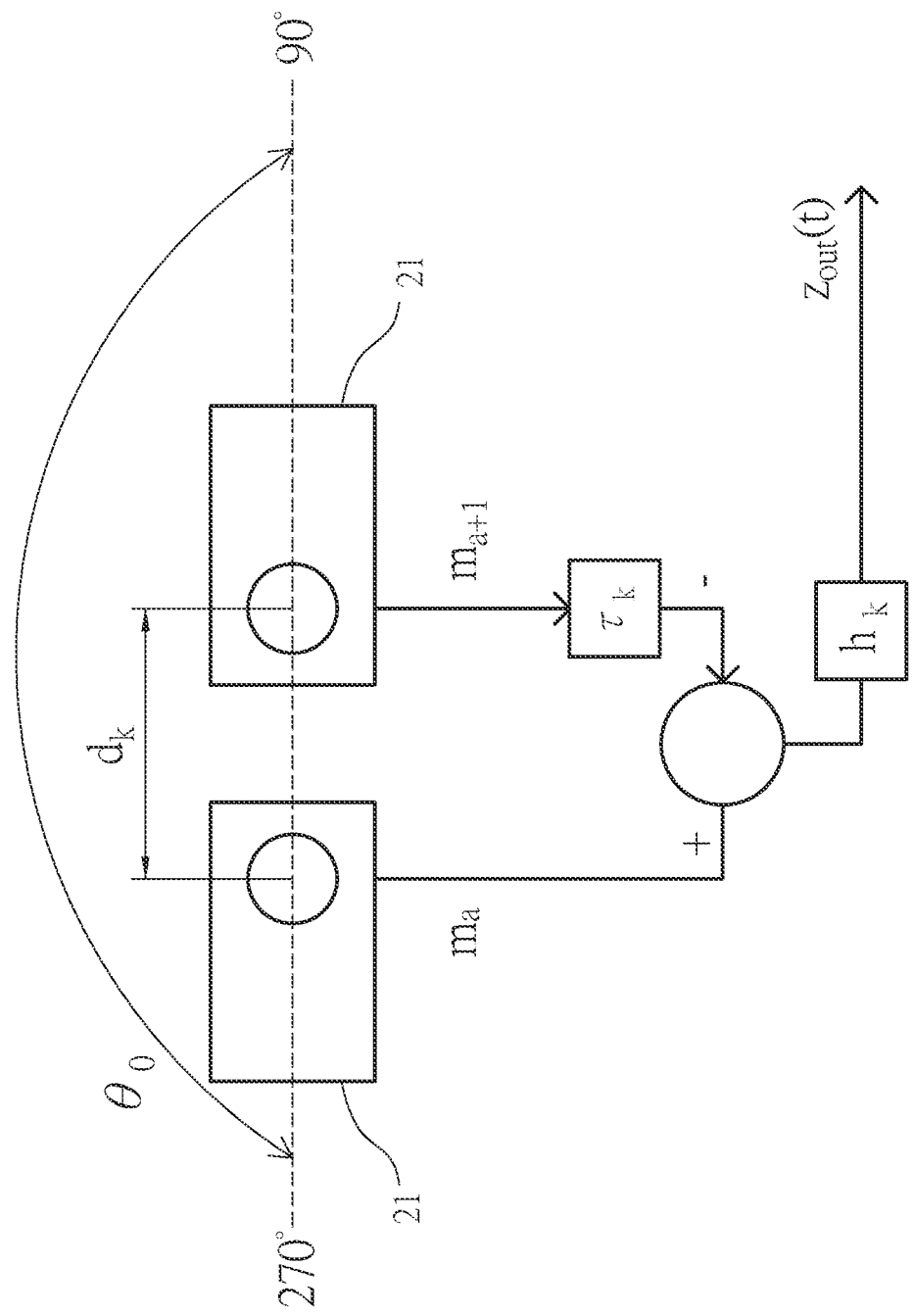
F I G . 5

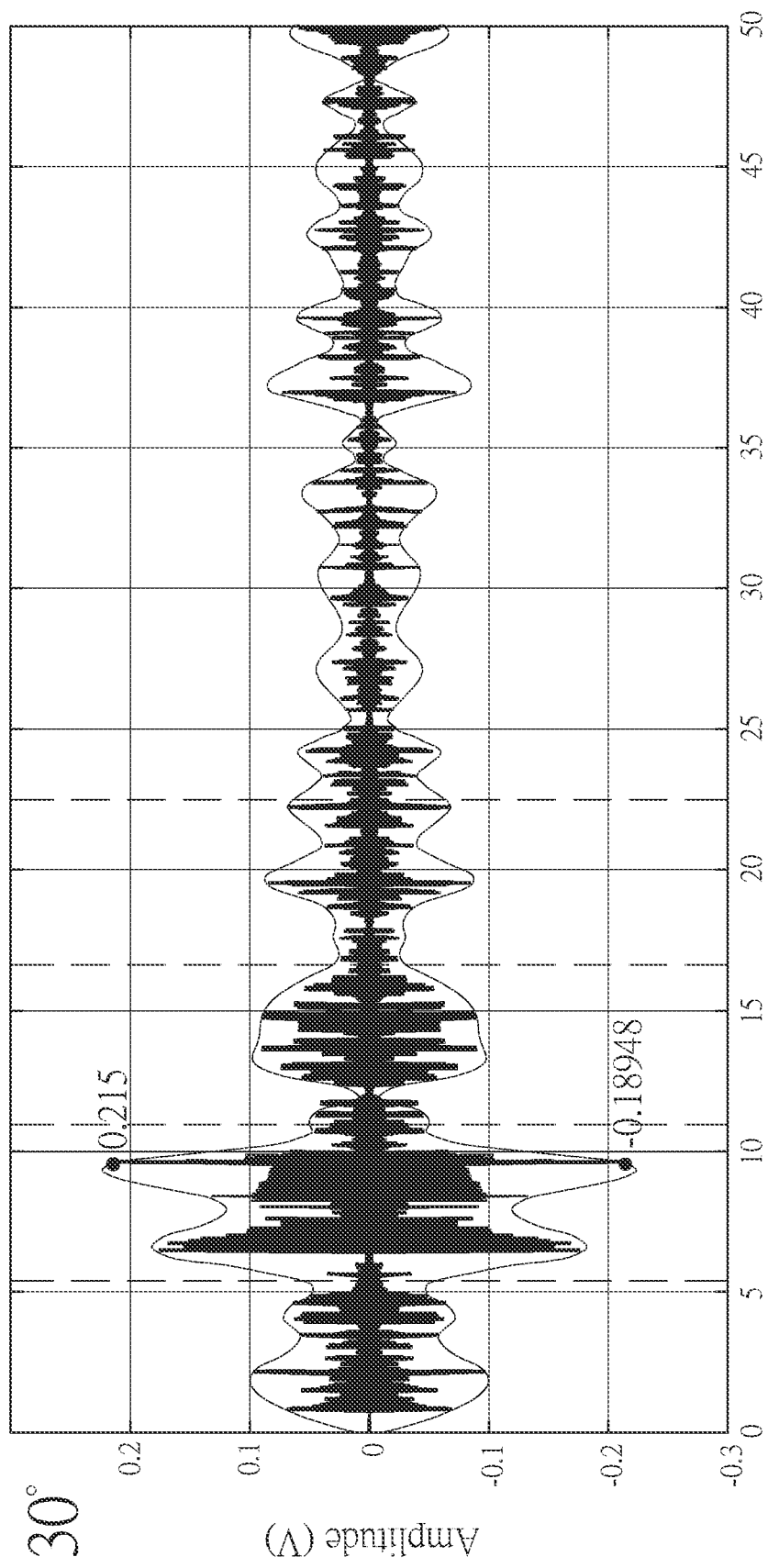
F I G. 7A

HEARING AIDING APPARATUS INTEGRATING IMAGE-ACOUSTICS POSITIONING, OMNIDIRECTIONAL ACOUSTIC RECEPTION, AND WARNING

BACKGROUND OF THE INVENTION

1. Technical Field

The present invention relates to a hearing aiding apparatus integrating image-acoustics positioning, omnidirectional acoustic reception, and warning, and more particularly to a hearing aiding apparatus that implements 360-degree acoustic-receiving operation and computer vision to hear speaking voices while focusing on the related speaking persons and to specifically recognize special ambient sounds coming from the user's visual blind spots, such as approaching siren sounds. The present invention also relates to a method of such an apparatus.

2. Description of Related Art

Some researchers have disclosed the impaired between hearing loss and neurological diseases. For example, hearing loss is believed to be positively correlated to the onset of Alzheimer's disease. In addition to injury-induced hearing loss, hearing loss also happen as people get old. In particular, the elders aged 60 and more tend to suffer from inconveniences associated with degraded hearing in their daily life and impaired hearing can often discourage people from speaking. As a solution, use of hearing aids helps improve hearing or retard hearing impairment. The existing smart hearing aids are able to focus on and amplify particular human voices, and to effectively perform environmental noise cancellation. However, a smart hearing aid that can hear human voices from any direction while focusing on the associated speaking persons and can give warning of ambient sounds that require additional attention has not been seen in the art.

US Patent Publication No. US20210160624A1, titled "Hearing Aid with Speaking Voice or Image Recognition," has disclosed a hearing aid that uses a beamforming microphone array to receive sounds smartly and uses lip tracking to help separate audio signals, so that the hearing aid can show the image of the recognized speaking individual to the user through, for example, a display, and selectively amplify the audio signal associated with the speaking voice of the recognized individual. The prior-art device has also disclosed various implementations, such as a combination of glasses and an image sensor that can capture real-time image data of the field-of-view of the user, wherein the image sensor may be a camera, a smartphone, or a watch. The glasses may be replaced by a belt buckle or other a clip that can be fixed to the user's vest, pocket, collar, hat, and so on. Therein, as stated in Paragraph 0196 of the specification of the prior patent application, the hearing aid may alternatively be a camera-based directional hearing aid, for selectively amplifying sounds based on a look direction of a user. The user's look direction may be tracked by monitoring the user's direction with respect to the optical axis of the image sensor. The selective amplification of sounds is achieved using one or more microphones, such as directional microphones, which may be more sensitive to picking up sounds in certain direction, to capture sounds from the user's environment, and using sound classification to classify the captured sounds into segments containing music, tones, laughter, screams, or the like. As stated in Paragraph 0216 of the specification of the prior patent application, the hearing aid system may store voice characteristics and/or facial features of a recognized person to aid in recognition and selective amplification. For example, when an individual enters the field of view of the apparatus, the individual may be recognized as an individual that has been introduced to the device, or that has possibly interacted with the user in the past (e.g., a friend, colleague, relative, prior acquaintance, etc.). Accordingly, audio signals associated with the recognized individual's voice may be isolated and/or selectively amplified relative to other sounds in the environment of the user. However, if the target leaves the user's field-of-view during conversation, as stated in Paragraph 0228 of the specification of the prior patent application, the processor may analyze the voice of the individual by determining whether the detected voice matches a voiceprint of an individual in database, so as to enable the hearing aid to keep selectively amplifying the voice of the target.

The specification of US20210160624A1 only generally describes the use of a neural network or a convolutional neural network for isolation of voices/sounds, yet gives no detail about the mentioned implementations, leaving questions unanswered. For example, how should the microphones be arrayed to receive voices/sounds effectively? Additionally, how to focus on a target image and a target's voice "omnidirectionally'"? The prior application fails to provide any technical scheme. Moreover, although the prior application classifies captured ambient sounds into segments containing music, tones, laughter, screams, or the like, real-time warning for informing users of ambient sounds associated with danger is absent.

The inventor of the present invention has filed a patent application in Taiwan titled "Method, Device, Composite Microphone of the Device, Computer Program and Computer Readable Medium for Automatically or Freely Selecting an Independent Voice Target" and published as Taiwan Patent Application No. 110119518. The prior application uses high-order beamforming (two or more) to specifically receive voices from targets and strengthen the speaking voices (the main lobe for voice receiving is preferably within 20 degrees), while capturing images of the targets. The voices belonging to each target image are then isolated using a smart learning algorithm that is capable of identifying overlapped target images, so that the user can select a target image and asks the device to play corresponding voices.

Currently, most hearing aiding apparatuses having image recognition function accomplish recognition using the combination of visual tracking and beamforming, but only focus on the front in terms of both image- and voice-capturing and directly filter out all ambient sounds without any processing. Consequently, images and voices/sounds in all directions other than the front with respect to the user, such as at the back of the user, will be excluded. Specifically, when the target is not in the user's field of view, the hearing aid is unable to focus on the voices of the target. Besides, since ambient sounds are usually filtered out, the existing apparatuses are unable to warn users of any sound coming from the back of the user indicating something that requires special attention, such as an ambulance's siren sound, a fire-fighting truck's siren sound, or a horn sound of a car approaching from the back, preventing the users from avoiding the approaching cars timely.

SUMMARY OF THE INVENTION

Hence, the present invention provides a hearing aiding apparatus integrating image-acoustics positioning, omnidirectional acoustic reception, and warning. The apparatus comprises:

an apparatus body, provided with a playing unit; a 360-degree acoustic-receiving unit, provided in the apparatus body, the 360-degree acoustic-receiving unit comprising six arrayed microphone chips, each of the microphone chips defending an acoustic-receiving zone, any two of the acoustic-receiving zones connected by an imaginary line that is located on an acoustic-receiving line corresponding to 0 degree, 60 degrees, 90 degrees, 120 degrees, 150 degrees, 180 degrees, 210 degrees, 240 degrees, 270 degrees, 300 degrees, and 380 degrees with respect to a front of the 360-degree acoustic-receiving unit, for the 360-degree acoustic-receiving unit to capture an audio signal around the apparatus body, the audio signal including an ambient sound and a speaking voice; an image-capturing unit, provided in the apparatus body, the image-capturing unit capturing a human-face image in an image-capturing azimuth around the apparatus body, or pointing a target around the apparatus body in a pointing azimuth; a warning unit, provided in the apparatus body; a control unit, storing at least one predetermined human-face image, at least one predetermined speaking voice, and at least one special ambient sound audio, the control unit being in signal communication with the playing unit, the 360-degree acoustic-receiving unit, the image-capturing unit, and the warning unit, the control unit receiving the audio signal and the human-face image, when the human-face image matches any of the predetermined human-face image, the control unit using a second instruction to instruct the image-capturing unit to focus on the human-face image, and controlling the 360-degree acoustic-receiving unit to continuously capture the speaking voice at the image-capturing azimuth according to the image-capturing azimuth, and the playing unit playing the speaking voice; when there is not the human-face image, or the human-face image does not match the predetermined human-face image, if the speaking voice matches any of the predetermined speaking voice, the control unit using a third instruction to instruct the playing unit to play the speaking voice matching the predetermined speaking voice; when there is not the human-face image, or the human-face image does not match the predetermined human-face image, and the speaking voice does not match the predetermined speaking voice, the control unit controlling the 360-degree acoustic-receiving unit to continuously capture the ambient sound and/or the speaking voice at the pointing azimuth according to the pointing azimuth, and controlling the playing unit to play the ambient sound and/or the speaking voice; the control unit further controlling the 360-degree acoustic-receiving unit to keep capturing the ambient sound all around the apparatus body, the control unit determining whether the ambient sound is contained in the special ambient sound audio through comparison, and when the ambient sound is contained in the special ambient sound audio, the control unit precedentially displaying the ambient sound, and interrupting or reducing the speaking voice, and the control unit also controlling the warning unit to issue a warning message in a real-time manner.

Further, the six acoustic-receiving zones are arranged into three columns in the 360-degree acoustic-receiving unit, the first column having the first acoustic-receiving zone and the second acoustic-receiving zone that are arranged in a line, the second column having the third acoustic-receiving zone, the fourth acoustic-receiving zone, and the fifth acoustic-receiving zone offset that are each offset from an adjacent counterpart or adjacent counterparts thereof, and the third column having a sixth acoustic-receiving zone; therein, the acoustic-receiving line formed by the fifth acoustic-receiving zone and the sixth acoustic-receiving zone being in a 0- and 180-degree azimuth, the acoustic-receiving line formed by the second acoustic-receiving zone and the fourth acoustic-receiving zone being in a 30- and 210-degree azimuth, the acoustic-receiving line formed by the third acoustic-receiving zone and the fourth acoustic-receiving zone being in a 60- and 240-degree azimuth, the acoustic-receiving line formed by the first acoustic-receiving zone and the second acoustic-receiving zone being in a 90- and 270-degree azimuth, the acoustic-receiving line formed by the fourth acoustic-receiving zone and the fifth acoustic-receiving zone being in a 120- and 300-degree azimuth, and the acoustic-receiving line formed by the first acoustic-receiving zone and the fourth acoustic-receiving zone being in a 150- and 330-degree azimuth.

Further, when the human-face image is no more useful for the apparatus to focus on the speaking voice at the image-capturing azimuth due to angular deflection, the control unit uses an advanced-adaptation-combined differential microphone array (DMA) algorithm to focus on a loudest human speaking voice as the speaking voice, and to isolate the speaking voice and the ambient sound from the audio signal.

Further, the advanced-adaptation-combined DMA algorithm is represented by: $S_m(t)=h_m^T Q(t)+U_m(t)$, where $S_m(t)$ denotes the audio signal received by the $m^{th}$ microphone chip; $Q(t)=[q(t) \ldots q(t-K_g+1)]^T$ denotes an impulse response of the speaking voice to the $m^{th}$ microphone chip, presented as a set of column vectors of $K_g$ samples of zero-mean signals; $h_m=[h_{m,1} \ldots h_{m,Kg}]$ denotes the column vector of the sample $K_g$; $U_m(t)$ denotes the ambient sound in the audio signal, and T is a transpose operator, whereby the advanced-adaptation-combined DMA algorithm calculates the audio signals received by the $m_a^{th}$ microphone chip and by the $m_{a+1}^{th}$ microphone chip; the microphone chip having pointing pattern that is defined by a zero-point deflection angle $\theta_0$, and the angle is determined by a distance $d_k$ and a delay time $\tau_k$ between the microphone chips, represented by: $\theta_0=\cos^{-1}(-c\tau_k/d_k)$, where c denotes a speed of sound; the pointing pattern being of a cardioid pattern ($\theta_0=180$, $\tau_k=d_k/c$), so that frequency response is obtained using a compensating factor $$h_k = \frac{1}{1-\exp(-j2\omega\tau_k)}.$$

Further, the image-capturing unit comprises two cameras, and the two cameras are located at opposite, front and rear ends of the neck-worn portion, respectively.

Further, the warning unit comprises two vibrators, and the two vibrators are located at opposite, left and right sides of the neck-worn portion, respectively. Therein, the control unit identifies an azimuth of the ambient sound through the 360-degree acoustic-receiving unit, and the control unit separately controls one of the vibrators corresponding to the azimuth of the ambient sound to vibrate.

Further, the apparatus body comprises two ear-worn portions and a neck-worn portion, in which the 360-degree acoustic-receiving unit and the image-capturing unit are provided in the neck-worn portion, while the warning unit and the playing unit are provided in the two ear-worn portions.

Further, the apparatus body comprises two ear-worn portions and a head-worn portion, in which the 360-degree acoustic-receiving unit and the image-capturing unit are provided in the head-worn portion, while the warning unit and the playing unit are provided in the two ear-worn portions.

Further, the apparatus body comprises two ear-worn portions and a pendant portion in wireless connection, and the pendant portion is provided with a detachable lanyard, in which the 360-degree acoustic-receiving unit and the image-capturing unit are provided in the pendant portion, while the warning unit and the playing unit are provided in the two ear-worn portions.

The present invention also provides a hearing aiding method integrating image-acoustics positioning and omnidirectional acoustic reception. The method comprises the following steps: storing a plurality of special ambient sound audios; storing a plurality of predetermined human-face images; storing a plurality of predetermined speaking voices; having the 360-degree acoustic-receiving unit continuously collect an ambient sound and a speaking voice, having the image-capturing unit capture a human-face image at a variable image-capturing azimuth or point a target at a pointing azimuth; having the control unit compare the ambient sounds to the special ambient sound audios, and generate a first instruction when a match is found; having the control unit compare the human-face image to the predetermined human-face images, and generate a second instruction when a match is found; having the control unit compare the speaking voice to the predetermined speaking voices, and generate a third instruction when a match is found; having the image-capturing unit activate the pointing azimuth and generate a fourth instruction; using the first instruction to instruct the playing unit to display the present ambient sound and generate a warning message; using the second instruction to instruct the image-capturing unit to focus on the human-face image, and instruct the playing unit to play the speaking voice at the image-capturing azimuth; using the third instruction to instruct the playing unit to play the speaking voice matching the predetermined speaking voice; using the fourth instruction to instruct the playing unit to play the ambient sound and/or the speaking voice at the pointing azimuth, wherein the first instruction, the second instruction, the third instruction, and the fourth instruction are executed in an execution order or in a maneuver order. The execution order is the first instruction being prior to the second instruction, the second instruction being prior to the third instruction, and the third instruction being prior to the fourth instruction, while the maneuver order is the first instruction having the top priority, and the fourth instruction being prior to the second instruction and the third instruction. When at least two of the first instruction, the second instruction, the third instruction, and the fourth instruction exist, the control unit executes the existing ones of the first instruction, the second instruction, the third instruction, and the fourth instruction in the execution order or in the maneuver order. When only one of the first instruction, the second instruction, the third instruction, and the fourth instruction exists, the control unit only executes the existing one of the first instruction, the second instruction, the third instruction, and the fourth instruction.

The warning message is to make the warning unit generate vibration.

Further, when there are two or more human-face images matches the predetermined human-face images, the second instruction instructs the image-capturing unit to focus on the human-face image at an image-capturing azimuth closest to the image-capturing unit, and instructs the playing unit to play the speaking voice closest to the image-capturing azimuth.

Further, when the image-capturing unit fails to focus on the human-face image, the control unit uses the advanced-adaptation-combined DMA algorithm to focus on the speaking voice that is currently loudest, and controls the playing unit to play the loudest speaking voice.

Further, when there is no human-face image matching the predetermined human-face image, the second instruction instructs the playing unit to play the speaking voice closest to the pointing azimuth. When there are two or more speaking voices matching the predetermined speaking voices, the second instruction instructs the playing unit to play the speaking voice closest to the pointing azimuth. After the image-capturing unit activates the pointing azimuth, it further executes a pointing-azimuth-first command. The control unit replaces the execution order with the maneuver order according to the pointing-azimuth-first command.

With the technical features described above, the present invention provides the following effects:

1. With the 360-degree acoustic-receiving unit performing 360-degree acoustic reception and the image-capturing unit keeping tracking a speaking object to focus on an acoustic source, the present invention can use computer vision to focus on a human-face image within the shooting scope of the image-capturing unit and to continuously capturing a speaking voice of a speaking object, even if the speaking object is at an azimuth outside the user's field of view, such as at the right, at the left or at the back of the user. Thereby, the 360-degree acoustic-receiving unit can continuously capture the speaking voice of the speaking object as long as the speaking object speaks without needing the user to turn his/her head.

2. When the user is in a street, the present invention can recognize a special ambient sound (e.g., an ambulance's siren sound, a car's horn sound, etc.) and warn the user of the special ambient sound coming from wither side or the back of the user that tends to be ignored by the user.

3. In the present invention, with the six arrayed acoustic-receiving zones, the acoustic-receiving line at every major angle passes through at least two acoustic-receiving zones, thereby achieving 360-degree, omnidirectional acoustic reception.

4. When the human-face image is no more useful for the apparatus to focus on the speaking voice due to angular deflection, the control unit uses the advanced-adaptation-combined DMA algorithm to continuously focus on the loudest speaking voice, so as to ensure continuity of the speaking voice, and the user ca activate the pointing azimuth of the image-capturing unit anytime to focus on a speaking voice at any azimuth.

5. A warning ambient sound is always played precedentially. Human-face images and speaking voices of familiars are pre-stored, so a familiar participating in conversation can be focused promptly. When there are multiple familiars participating in conversation, the present invention can use the image-capturing azimuths of the cameras to select the speaking object, even if the familiar is located at the user's side or back where is not covered by the shooting scope. By comparing the speaking voice to the pre-stored data, the 360-degree acoustic-receiving unit can also perform object-specific acoustic reception to facilitate the user's conversation.

6. According to the method of the present invention, for the user's familiars with whom the user frequently has conversation, the familiars' human-face images and speaking voices can be pre-stored, whereas for acquaintances only speaking voices are stored. When processing the human-face images captured and the speaking voice received during conversation, the present invention determines their priority according to an "execution order": warning ambient sounds—speaking voices of familiars whose human-face images have been pre-stored—speaking voices of acquaintances whose speaking voices have been pre-stored—speaking voices of strangers. The execution order allows an individual most frequently talking with the user to be focused promptly, thereby improving conversation efficiency.

7. The method of the present invention also facilitates conversation with strangers. Although for a stranger there is not any human-face image or speaking voice stored in advance, during conversation participated by familiars and strangers, the image-capturing unit can activate a pointing-azimuth-first command to allow the user to select to have conversation with a stranger or a certain familiar precedentially, thereby perfectly meeting practical conversation needs.

BRIEF DESCRIPTION OF THE DRAWINGS

FIG. 1B 1 is a perspective view of a hearing aiding apparatus of the present invention in another embodiment, whose apparatus body comprises a head-worn portion and ear-worn portions.

FIG. 1C 1 is a perspective view of a hearing aiding apparatus of the present invention in another embodiment, whose apparatus body comprises a pendant portion and ear-worn portions.

FIG. 5 is a schematic drawing showing the microphone chips arranged to implement an advanced-adaptation-combined DMA algorithm.

FIG. 7A shows the test result obtained from the test as depicted in FIG. 6, indicating that an acoustic source at the 30-degree azimuth was detected according to the signal peak.

DETAILED DESCRIPTION OF THE INVENTION

Figure 1:
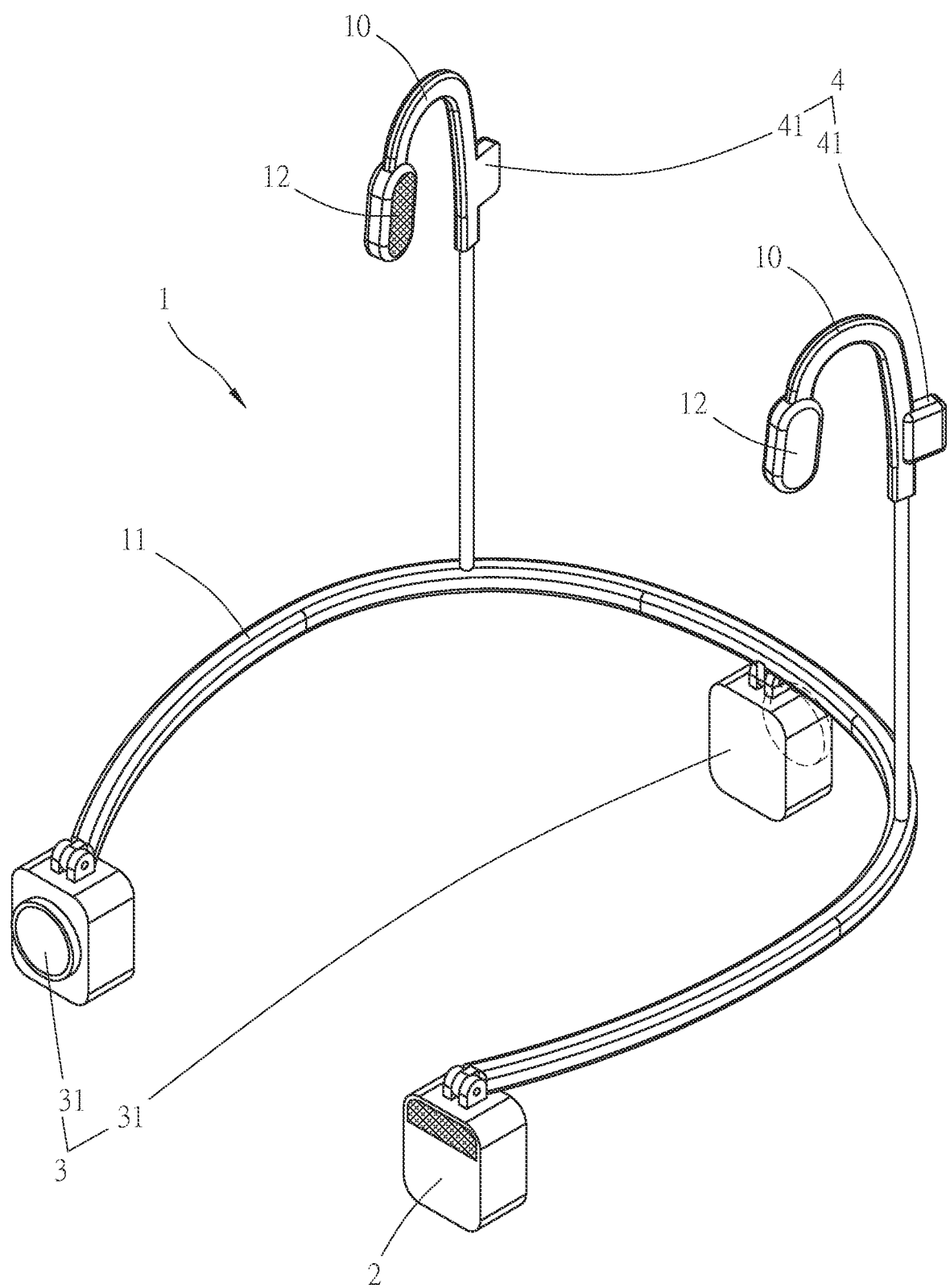
FIG. 1 is a perspective view of a hearing aiding apparatus of the present invention, wherein an apparatus body comprises a neck-worn portion and ear-worn portions.

While some embodiments will be described in detail to explain the hearing aiding apparatus integrating image-acoustics positioning, omnidirectional acoustic reception, and warning of the present invention, they are illustrative only and shall not form any limitation to the present invention.

Please refer to FIG. 1, FIG. 1A, FIG. 2, and FIG. 3. In the depicted embodiment, a hearing aiding apparatus comprises an apparatus body 1, a 360-degree acoustic-receiving unit 2, an image-capturing unit 3, a warning unit 4, and a control unit 5.

The apparatus body 1 comprises two ear-worn portions 10, a neck-worn portion 11, and a playing unit 12. The neck-worn portion 11 connects the two ear-worn portions 10. The neck-worn portion 11 is configured to be mounted around a user's neck so that the ear-worn portions 10 can be hung on the user's ears. In the present embodiment, the playing unit 12 and the warning unit 4 are provided in each of the ear-worn portions 10.

Figure 1A:
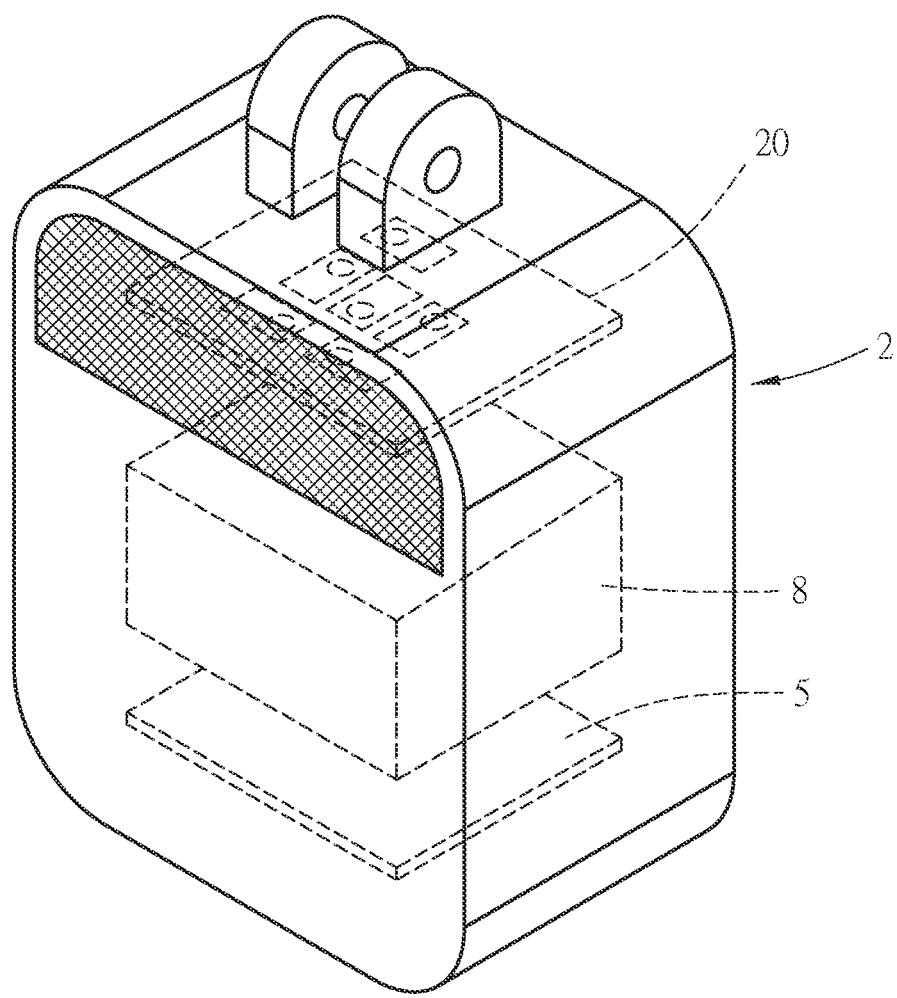
FIG. 1A is a schematic drawing of a 360-degree acoustic-receiving unit of the hearing aiding apparatus, showing a circuit board therein.
Figure 4:
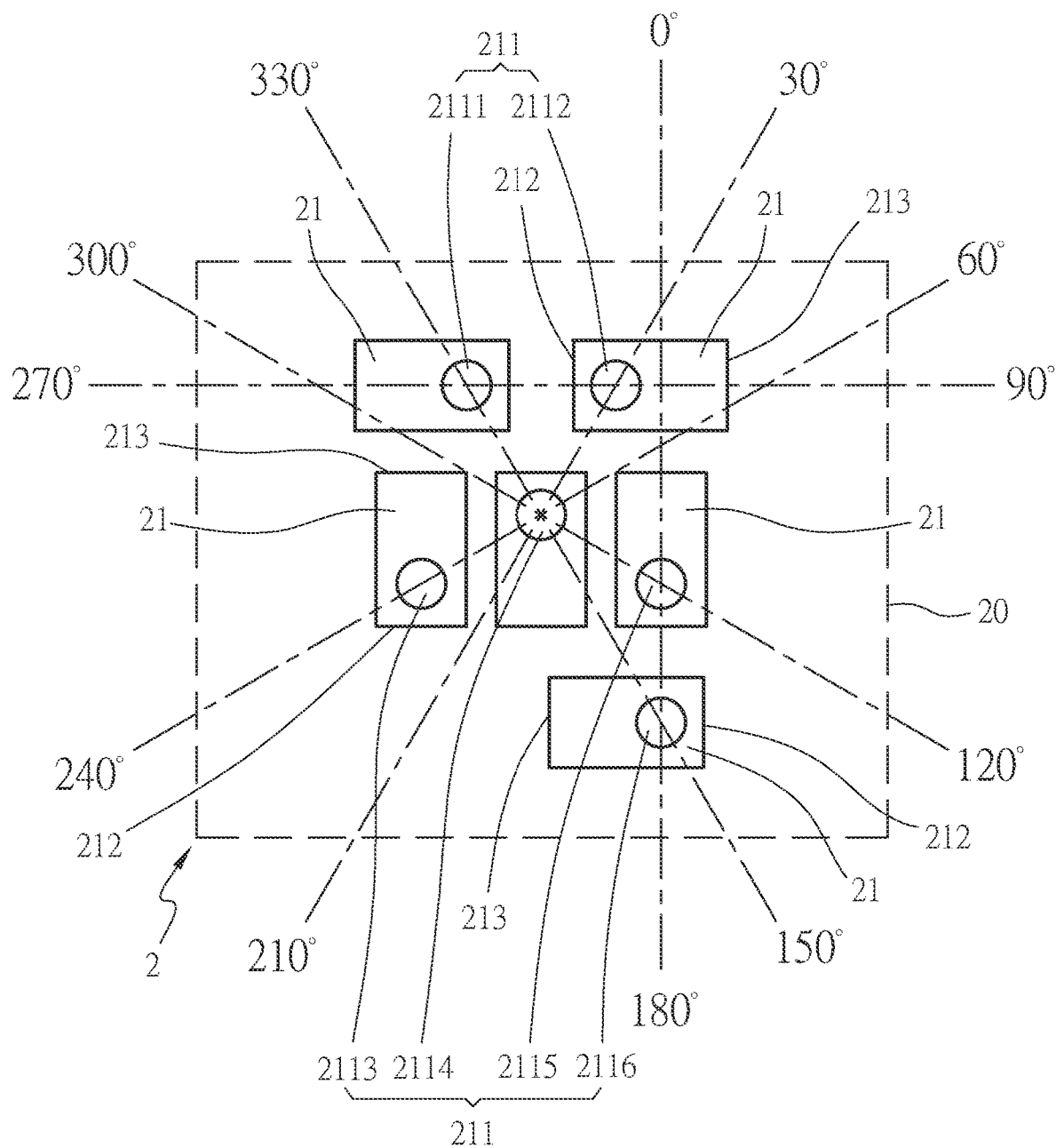
FIG. 4 is a schematic drawing showing a microphone chip array in the 360-degree acoustic-receiving unit of the hearing aiding apparatus of the present invention.

Referring to FIG. 1, FIG. 1A, and FIG. 4, the 360-degree acoustic-receiving unit 2 is provided in the apparatus body 1 for capturing audio signals all around the apparatus body 1. The audio signals include ambient sounds and speaking voices. The 360-degree acoustic-receiving unit 2 comprises a circuit board 20. Preferably, the circuit board 20 is positioned horizontally in use, so that the circuit board 20 can perform 360-degree acoustic reception in a horizontal position. However, the circuit board 20 may be configured otherwise, without limitation. In the present embodiment, the 360-degree acoustic-receiving unit 2 is pivotally connected to one of two ends of the neck-worn portion 11. This allows angular adjustment between the 360-degree acoustic-receiving unit 2 and the neck-worn portion 11, which enables the circuit board 20 to be positioned as horizontally as possible. The 360-degree acoustic-receiving unit 2 comprises six microphone chips 21. The six microphone chips 21 are mounted on the circuit board 20. Each of the microphone chips 21 has an acoustic-receiving zone 211. The microphone chip 21 defines a first side 212 and a second side 213 opposite to each other. The acoustic-receiving zone 211 is closer to the first side 212 than to the second side 213. The six microphone chips 21 are arranged into three columns. The first column has two microphone chips 21. The second column has three microphone chips 21. The third column has one microphone chip 21. The two adjacent microphone chips 21 in the first column are such juxtaposed that their first side 212 adjacent to each other. Among the three microphone chips 21 in the second column, the middle microphone chip 21 has its first side 212 adjacent to the microphone chips 21 in the first column, and the two flanking microphone chips 21 each have its second side 213 adjacent to the corresponding microphone chip 21 in the first column. The microphone chip 21 in the third column is aligned with one of the two microphone chips 21 in the first column and is in a position reverse to that of the aligned microphone chip 21 in the first column. Specifically, the six acoustic-receiving zones are arranged into three columns on the circuit board 30. The first column has a first acoustic-receiving zone 2111 and a second acoustic-receiving zone 2112 that are arranged in a line. The second column has a third acoustic-receiving zone 2113, a fourth acoustic-receiving zone 2114, an a fifth acoustic-receiving zone 2115 that are each offset from its adjacent counterpart(s). The third column has a sixth acoustic-receiving zone 2116. Therein, the fifth acoustic-receiving zone 2115 and the sixth acoustic-receiving zone 2116 form an acoustic-receiving line that is in a 0- and 180-degree azimuth. The second acoustic-receiving zone 2112 and the fourth acoustic-receiving zone 2114 form an acoustic-receiving line that is in a 30- and 210-degree azimuth. The third acoustic-receiving zone 2113 and the fourth acoustic-receiving zone 2114 form an acoustic-receiving line that is in a 60- and 240-degree azimuth. The first acoustic-receiving zone 2111 and the second acoustic-receiving zone 2112 form an acoustic-receiving line that is in a 90- and 270-degree azimuth. The fourth acoustic-receiving zone 2114 and the fifth acoustic-receiving zone 2115 form an acoustic-receiving line that is in a 120- and 300-degree azimuth. The first acoustic-receiving zone 2111 and the fourth acoustic-receiving zone 2114 form an acoustic-receiving line that is in a 150- and 330-degree azimuth. Therein, the acoustic-receiving line formed by the first acoustic-receiving zone 2111 and the fourth acoustic-receiving zone 2114 also passes through the sixth acoustic-receiving zone 2116. However, the acoustic-receiving performance along the acoustic-receiving line in the 150- and 330-degree azimuth is independent of whether the acoustic-receiving line acoustic-receiving line the sixth acoustic-receiving zone 2116. Additionally, according to the array arrangement shown in FIG. 4, there are in fact more acoustic-receiving lines in more azimuths existing, such as one formed by the first acoustic-receiving zone 2111 and the third acoustic-receiving zone 2113, one formed by the first acoustic-receiving zone 2111 and the fifth acoustic-receiving zone 2115, one formed by the third acoustic-receiving zone 2113 and the sixth acoustic-receiving zone 2116, and so on. The acoustic-receiving lines detailed above are just some representative azimuths of acoustic-receiving lines, and form no limitation to the present invention. Preferably, the 0-degree direction is the user's straight look direction. Moreover, it is preferable that the six microphone chips 21 are of the same dimensions, thereby facilitating modular fabrication. With the matrix-like arrangement as described previously, omnidirectional acoustic reception can be achieved with merely six microphone chips 21 and a very small surface area on the circuit board 20. Moreover, every acoustic-receiving line corresponding to a major azimuth, such as 0 degree, 30 degrees, 60 degrees, 90 degrees, 120 degrees, 150 degrees, 180 degrees, 210 degrees, 240 degrees, 270 degrees, 300 or degrees, 330 degrees with respect to the front of the 360-degree acoustic-receiving unit 2 passes through at least two acoustic-receiving zones 211. However, in other embodiments, the six microphone chips 21 may alternatively be of different dimensions according to practical needs.

Referring to FIG. 1, FIG. 1A, FIG. 2, and FIG. 3, the image-capturing unit 3 is pivotally connected to the apparatus body 1 to capture human-face images all around the apparatus body 1. In the present embodiment, the image-capturing unit 3 comprises two cameras 31, each of which has a wide shooting angle of, for example, 180 degrees. The two cameras 31 are pivotally connected to the other end of the neck-worn portion 11 and to the center of the neck-worn portion 11, respectively. Therein, the camera 31 pivotally connected to the end of the neck-worn portion 11 captures human-face images in front of the user, and the camera 31 pivotally connected to the center of the neck-worn portion 11 captures human-face images at the back of the user. In use, the angles between each of the cameras 31 and the neck-worn portion 11 can be adjusted. In the present invention, the image-capturing unit 3 may be realized by three or more cameras 31 equidistantly arranged along the neck-worn portion 11.

The warning unit 4 is provided in the ear-worn portions 10 of the apparatus body 1. In the present embodiment, the warning unit 4 comprises two vibrators 41, which are mounted on the two ear-worn portions 11, respectively. In the present invention, three or more vibrators 41 may be arranged on the ear-worn portions 10 and the neck-worn portion 11, respectively.

The control unit 5 comprises a processing unit and a storage unit. The processing unit is used to process instructions and perform computation. The storage unit stores at least one predetermined human-face image and at least one predetermined speaking voice, and at least one special ambient sound audio. In the present embodiment, the control unit 5 is in signal communication with the playing unit 12, the 360-degree acoustic-receiving unit 2, the image-capturing unit 3, and the warning unit 4. Additionally, a battery 8 is connected to and powers the control unit 5, the playing unit 12, the 360-degree acoustic-receiving unit 2, the image-capturing unit 3, and the warning unit 4. The control unit 5 and the battery 8 may be assembled to the 360-degree acoustic-receiving unit 2. The image-capturing unit 3 focuses on a speaking object 6 (shown in FIG. 9), and tracks the speaking object 6 to continuously capture human-face images of the speaking object 6. The 360-degree acoustic-receiving unit 2, with reference to the human-face image 6, continuously captures speaking voices of the speaking object 6 for the playing unit 12 to play. Specifically, the control unit 5 receives the audio signal and the human-face image and uses computer vision to isolate and enhance the speaking voice corresponding to the human-face image. Then the playing unit 12 plays the speaking voice while providing information of the identity of the speaking object. In the described implementation, the 360-degree acoustic-receiving unit 2 focuses on the speaking object 6 according to the image-capturing unit 3 and captures the speaking voice before it changes the focus. However, on top of that, the 360-degree acoustic-receiving unit 2 "always" captures ambient sounds and the control unit 5 compares the captured ambient sounds to the pre-stored special ambient sound audio to determine whether any of the captured ambient sounds is one of the special ambient sounds. If a captures ambient sound is a pre-stored special ambient sound, the control unit 5 controls the warning unit 4 to sound a warning message. For example, when the special ambient sound comes from the rear left of the user, the control unit 5 controls the left vibrator 41 to vibrate, so that the user can move rightward in response to the warning message in the form of vibrations at the left side and pays attention to the acoustic source of the special ambient sound approaching from the rear left (e.g., a patrol car's siren sound, an ambulance's siren sound, etc.). When the special ambient sound comes from the rear right of the user, the control unit 5 controls the right vibrator 41 to vibrate, so that the user can move leftward in response to the warning message in the form of vibrations at the right side and pays attention to the acoustic source of the special ambient sound approaching from the rear right.

In different embodiments, the control unit 5 may alternatively be a smartphone, a smart watch, or a tablet computer, which is in wireless connection with the playing unit 12, the 360-degree acoustic-receiving unit 2, the image-capturing unit 3, and a warning unit 4 through an APP to communicate instructions and messages.

Figure 1B:
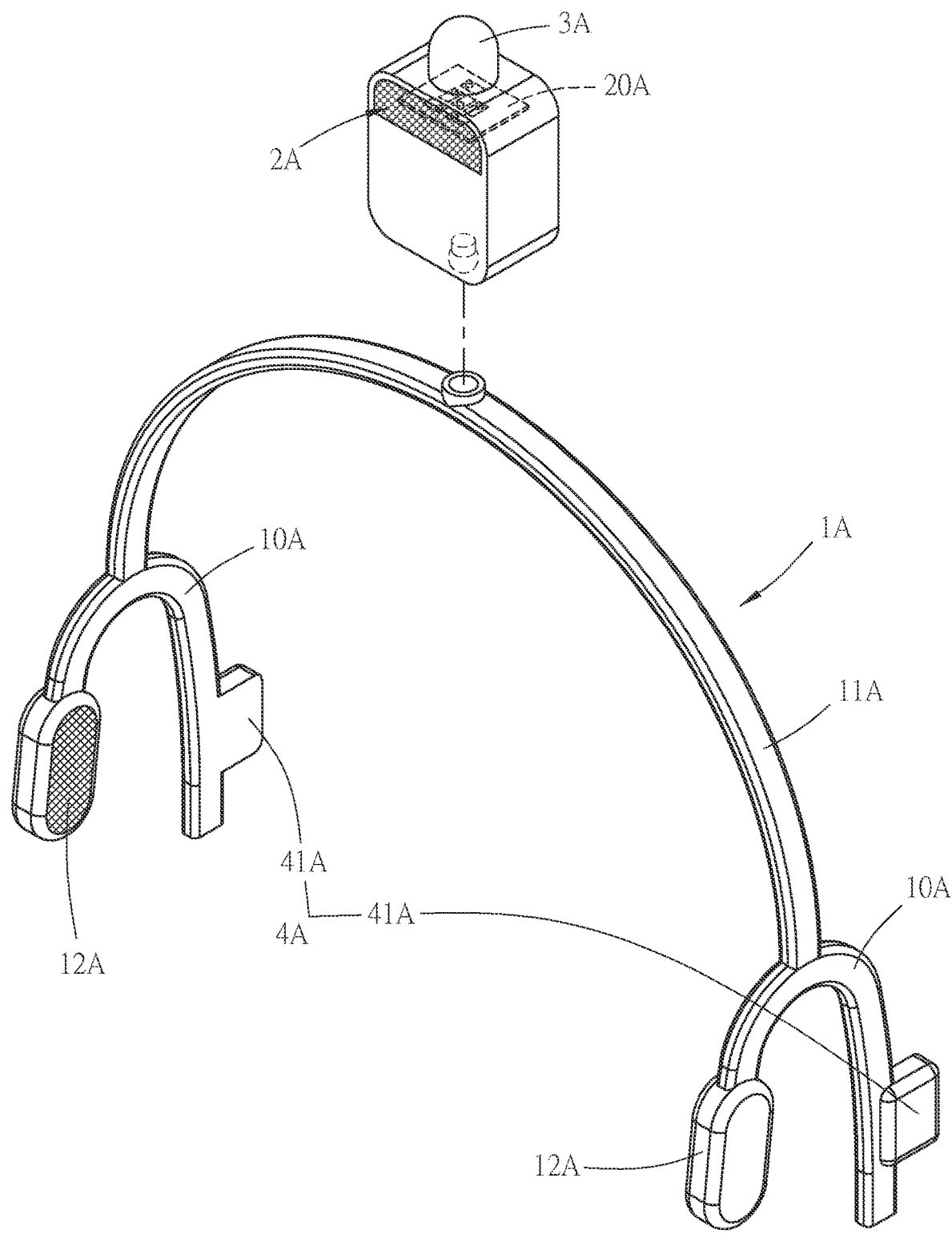

As shown in FIG. 1B, in different embodiments, the apparatus body 1A comprises two ear-worn portions 10A and a head-worn portion 11A. The head-worn portion 11A is to be mounted around a user's forehead so that the two ear-worn portions 10A can be hung on the user's ears. The image-capturing unit 3A and the 360-degree acoustic-receiving unit 2A are connected to the head-worn portion 11A from above through a ball joint so as to allow multi-directional adjustment. The playing unit 12A and the vibrators 41A of the warning unit 4A are provided in the ear-worn portions 10A, respectively. The 360-degree acoustic-receiving unit 2A similarly comprises a horizontally positioned circuit board 20A. The circuit board 20A similarly comprises arrayed six microphone chips (not indicated by symbols). The image-capturing unit 3A is a 360-degree panoramic camera 31A, which is configured to capture 360-degree panoramic images.

Figure 1D:
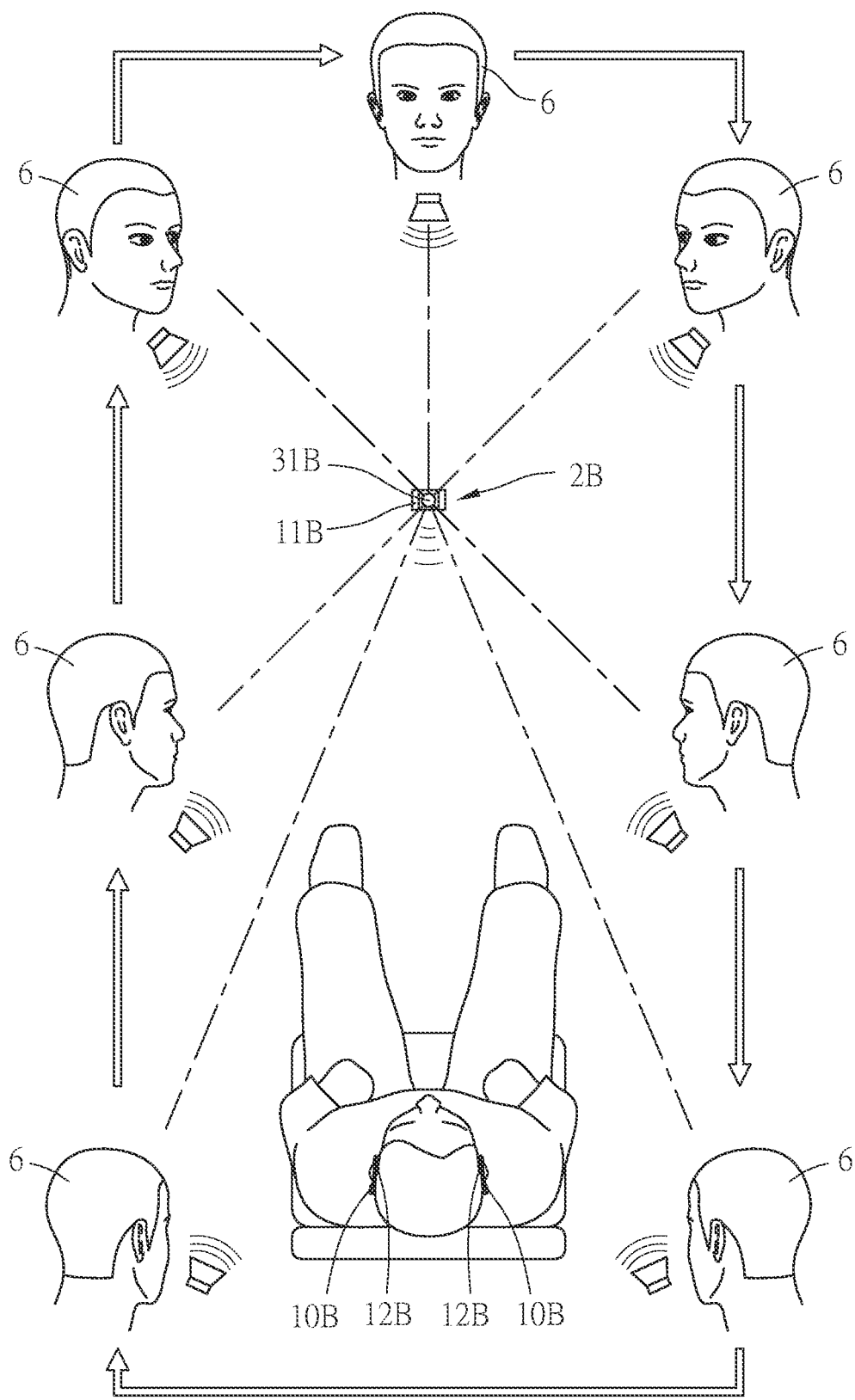
FIG. 1D is an applied view of the hearing aiding apparatus of the present invention used in a classroom according to another embodiment, wherein the pendant portion of the apparatus body is separated from the ear-worn portions.
Figure 2:
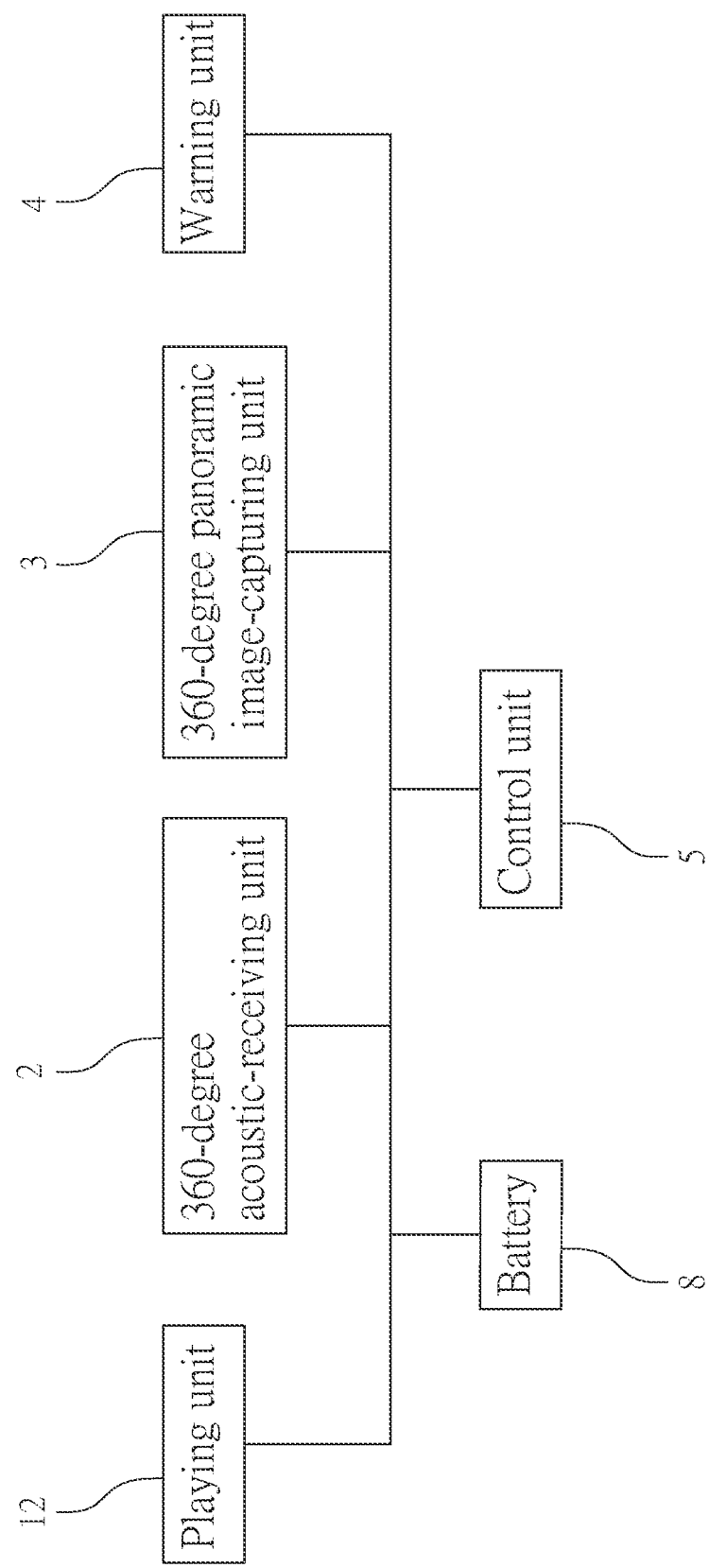
FIG. 2 is a block diagram illustrating connection among components of the hearing aiding apparatus of the present invention.
Figure 3:
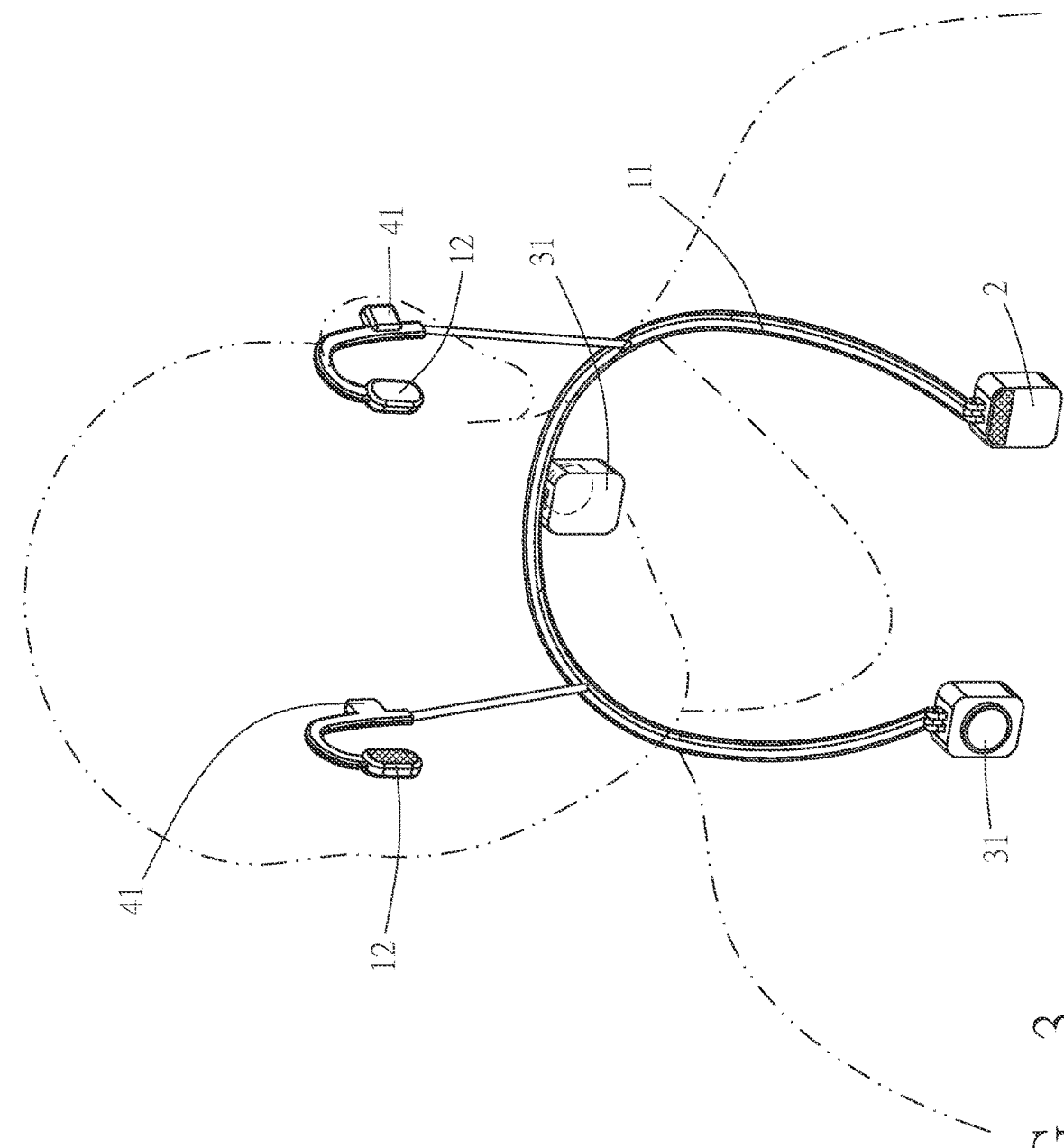
FIG. 3 is a schematic drawing depicting the hearing aiding apparatus of the present invention worn by a user.

FIG. 1C depicts another embodiment of the present invention. Therein, an apparatus body 1B comprises two ear-worn portions 10B and a pendant portion 11B. The pendant portion 11B is equipped with a detachable lanyard 111B to be put around a user's neck. When being put on, the pendant portion 11B is located in front of the chest of the user and the two ear-worn portions 10B are hung on the user's ears. The two ear-worn portions 10B and the pendant portion 11B are in wireless connection through Bluetooth or Wi-Fi. The image-capturing unit 3B and the 360-degree acoustic-receiving unit 2B are provided in the pendant portion 11B. The playing unit 12B and the vibrators 41B of the warning unit 4B are provided in the ear-worn portions 10B, respectively. The 360-degree acoustic-receiving unit 2B similarly comprises a horizontally positioned circuit board 20B. The circuit board 20B similarly comprises six arrayed microphone chips (not indicated by symbols). The image-capturing unit 3B is a 360-degree panoramic camera 31B, which is configured to capture 360-degree panoramic images. Referring to FIG. 1D, the apparatus of the present invention may be used in a classroom. In this case, the two ear-worn portions 10B are still hung on the user's ears, while the pendant portion 11B is placed at a remote site from the user, such as on a lectern. The 360-degree panoramic camera 31B is used to focus on the human-face image of a speaking object 6, such as a teacher. The 360-degree acoustic-receiving unit 2B is used to capture the teacher's voices. In this case, all voices and sounds other than the teacher's voices and warning ambient sounds will be filtered out. Through the wireless communication between the two ear-worn portions 10B and the pendant portion 11B, the teacher's voices can be transmitted to the playing units 12B at the two ear-worn portions 10B. As the teacher moves around in the classroom, the human-face image of the teacher captured by the 360-degree panoramic camera 31B may vary. For example, as the teacher moves in a moving path indicated by arrows in FIG. 1D, the captured partial human-face images and back-head images may be useless for the apparatus to focus the teacher's speaking voices. At this time, the apparatus uses the loudest voice in the environment as its target instead, so that the 360-degree acoustic-receiving unit 2B can remain effective in capturing the teacher's voices. In particular, the two ear-worn portions 10B and the pendant portion 11B in the present embodiment are in wireless connection, so that the pendant portion 11B can be hung before the user's chest through the lanyard 111B in daily conversation, and, in some special occasions, such as the user's attending a lecture or a speech, can be placed at a site remote from the user where the wireless connection works, to help focus on the speaking voice of the speaking object 6 and prevent interference from noises.

Referring to FIG. 5, when the human-face image is no more useful for the apparatus to focus on the speaking voice due to angular deflection, the control unit 5 may use an advanced-adaptation-combined differential microphone array (DMA) algorithm to focus on the loudest human voice in the environment as the speaking voice, and isolate speaking voices and ambient sounds from the received audio signals. The advanced-adaptation-combined DMA algorithm is represented by the following equation: $S_m(t)=h_m^T Q(t)+U_m(t)$, where $S_m(t)$ denotes the audio signal received by the $m^{th}$ microphone chip 21; $Q(t)=[q(t) \ldots q(t-K_g+1)]^T$ denotes the impulse response of the speaking voice to the $m^{th}$ microphone chip 21, presented as a set of column vectors of $K_g$ samples of a zero-mean signal; $h_m=[h_{m,1} \ldots h_{m,K_g}]$ denotes the column vector of the $K_g$ sample; $U_m(t)$ denotes the ambient sound in the audio signal; and T denotes the transpose operator. The advanced-adaptation-combined DMA algorithm thus can be used to calculate the audio signals received by the $m_a^{th}$ microphone chip 21 and the $m_{a+1}^{th}$ microphone chip 21. The pointing pattern of the microphone chips 21 is defined by a zero-point deflection angle $\theta_0$. The angle is determined by the distance $d_k$ and a delay time $\tau_k$ between the microphone chips 21, and is represented by the following equation: $\theta_0=\cos^{-1}(-c\tau_k/d_k)$, where c denotes the speed of sound. The pointing pattern is of a cardioid pattern ($\theta_0=180$, $k=d_k/c$). Then the frequency response can be figured out using the compensating factor $$h_k = \frac{1}{1-\exp(-j2\omega\tau_k)}.$$

With the foregoing algorithm, speaking voices can be isolated from the obtained audio signals.

Figure 6:
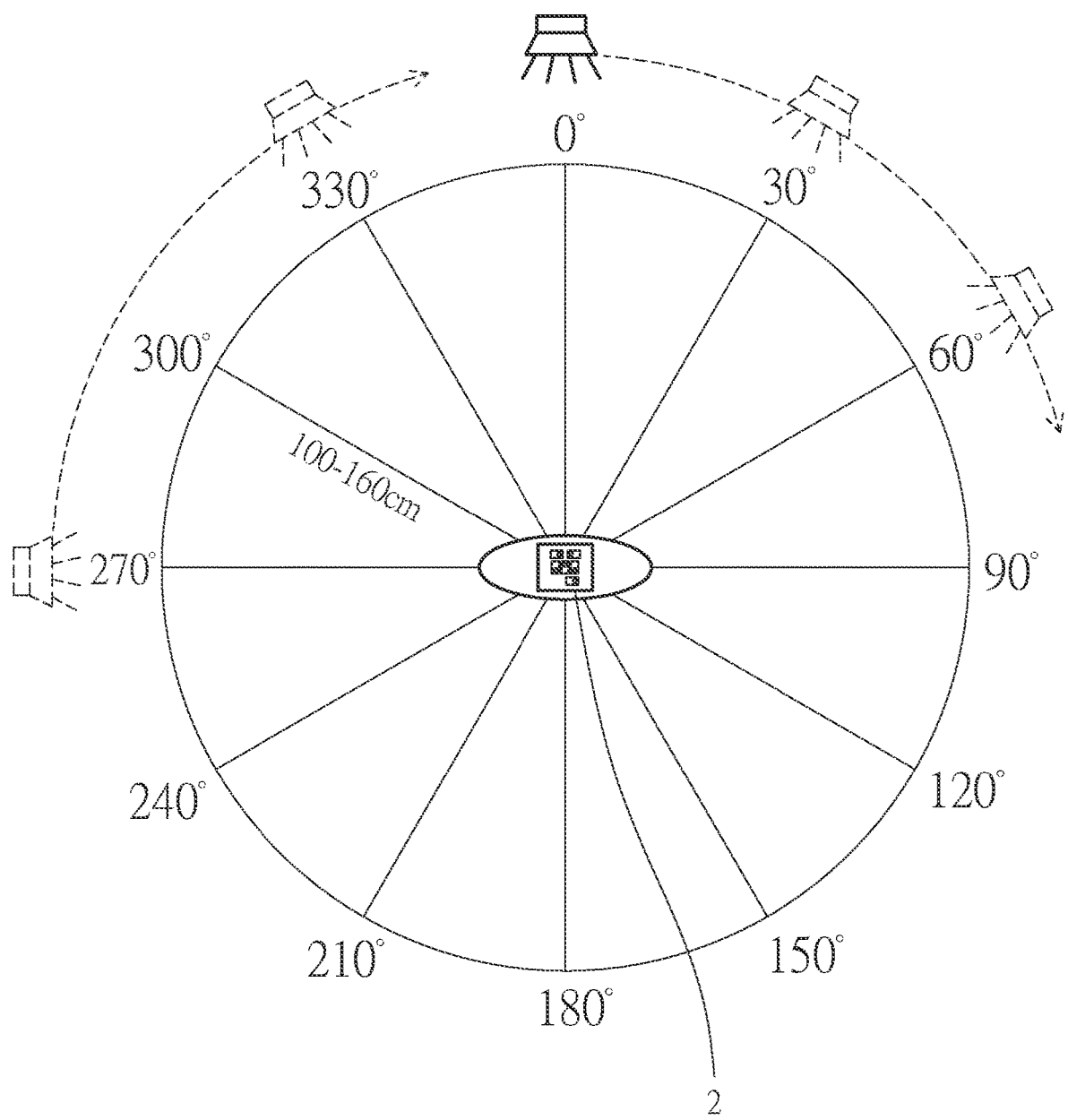
FIG. 6 is a schematic drawing showing a test setting wherein acoustic sources are arranged at different angles with respect to the microphone chips.
Figure 7B:
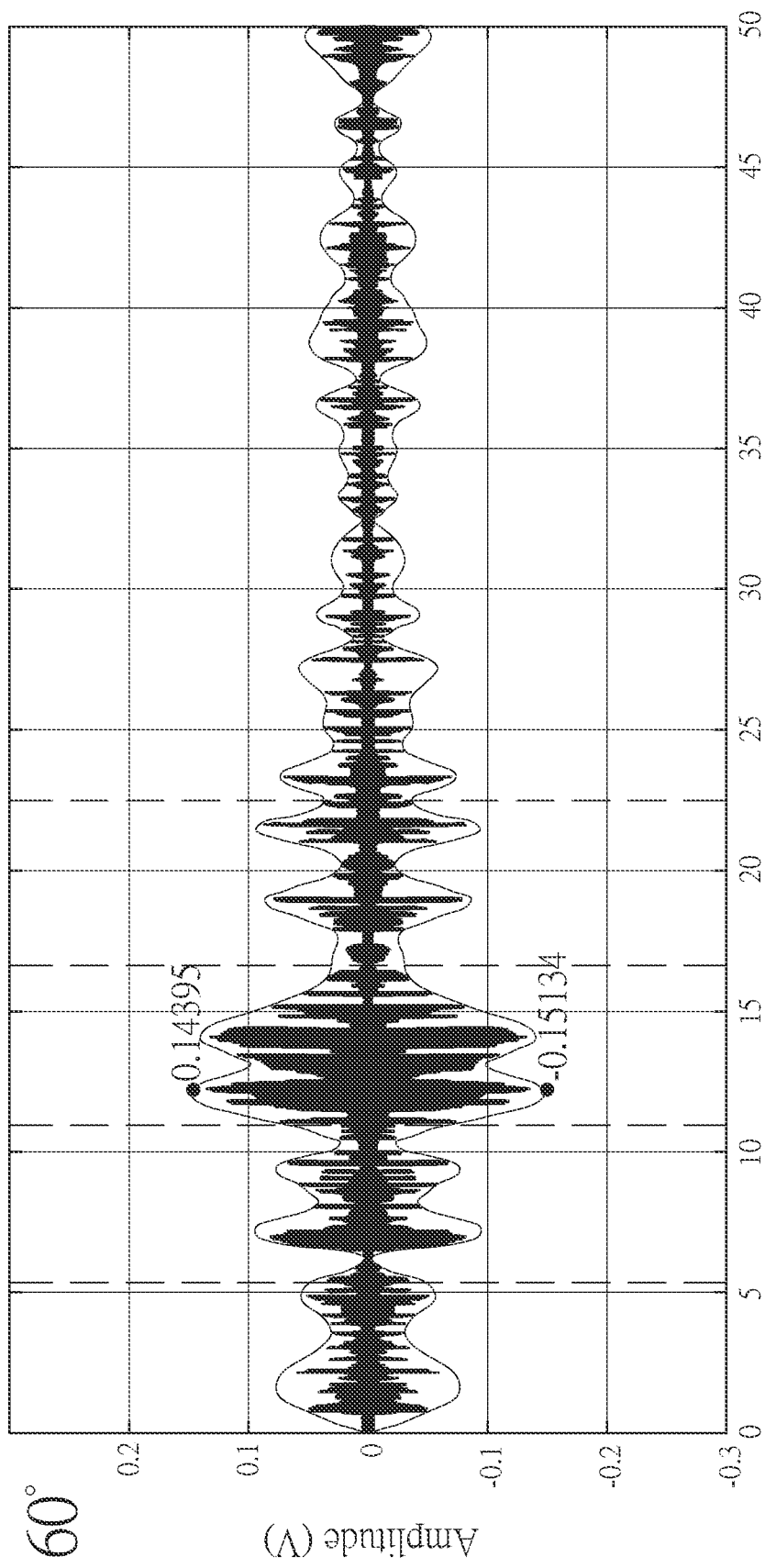
FIG. 7B shows the test result obtained from the test as depicted in FIG. 6, indicating that an acoustic source at the 60-degree azimuth was detected according to the signal peak.
Figure 7C:
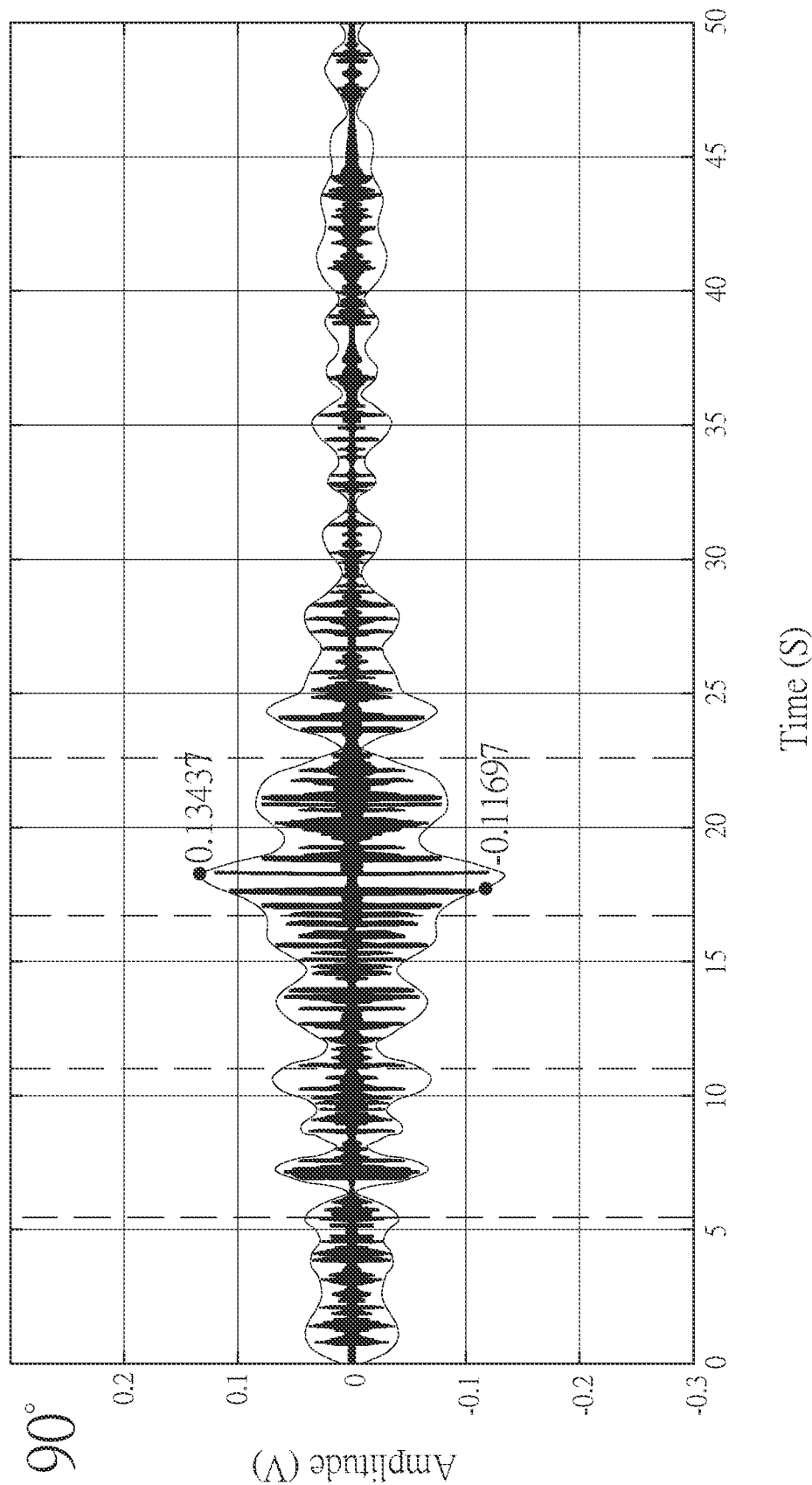
FIG. 7C shows the test result obtained from the test as depicted in FIG. 6, indicating that an acoustic source at the 90-degree azimuth was detected according to the signal peak.
Figure 8:
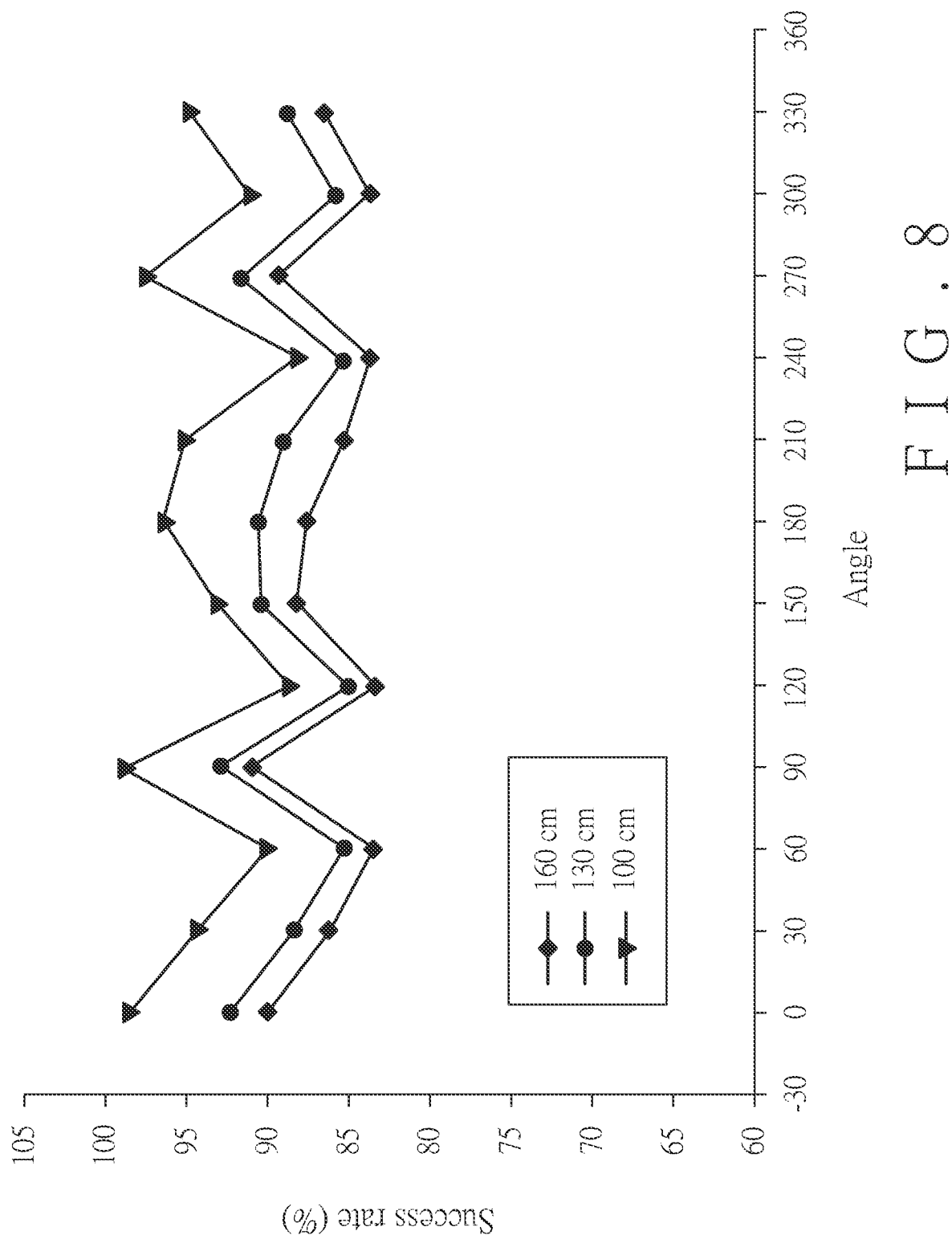
FIG. 8 shows the test results obtained from the test as depicted in FIG. 6, exhibiting the success rates at which the microphone chips detect the acoustic sources at different degrees with respect to the front of the acoustic-receiving unit.

Referring to FIG. 6 through FIG. 8, in the present embodiment, the microphone chips 21 are realized using non-directional microphones based on microelectromechanical systems (MEMS). With the special arrangement of the six microphone chips 21, precise, 360-degree acoustic reception can be ensured.

A test was performed to evaluate the ability of the 360-degree acoustic-receiving unit 2 to identify the acoustic source having the loudest volume in the environment when the human-face image is no more useful for the apparatus to focus on the speaking voice due to angular deflection. An acoustic source was actuated for 5 seconds at sites 100 cm, 130 cm, and 160 cm away from the 360-degree acoustic-receiving unit 2 in the 360-degree range starting from the 0-degree azimuth at a 30-degree interval. Then the audio signals corresponding to all of these sites were processed by means of Hilbert transform encoded using MATLAB™ codes, so as to calculate the amplitudes of the audio signals and locate the peak values. As shown in FIG. 7A through FIG. 7C, when the acoustic source was activated at the 30-degree azimuth, the peak value appearing between Second 5 and Second 10 was greater than the mean of the whole acoustic wave. When the acoustic source was activated at the 60-degree azimuth, the peak value appearing between Second 10 and Second 15 was greater than the mean of the whole acoustic wave. When the acoustic source was activated at the 90-degree azimuth, the peak value appearing between Second 15 and Second 20 was greater than the mean of the whole acoustic wave.

Therein, the success rates of test for the audio signals corresponding to different azimuths are determined using the equation:

$$\text{success rate } (\theta_t) = \frac{N_S}{N_T} * 100\%,$$

where $N_s$ denotes the number of successes every time the $\theta_t$ was the 30-degree azimuth, and $N_T$ denotes the total number of repetitions. In the present embodiment, 100 repetitions ($N_T$) were conducted for each of the 30-degree separated azimuths. As shown in FIG. 8, the success rates for most of the tested azimuths are greater than 90%. While the success rates seem inferior for the 60-degree azimuth, the 120-degree azimuth, the 240-degree azimuth, and the 300-degree azimuth, they are all greater than 80%.

Figure 9:
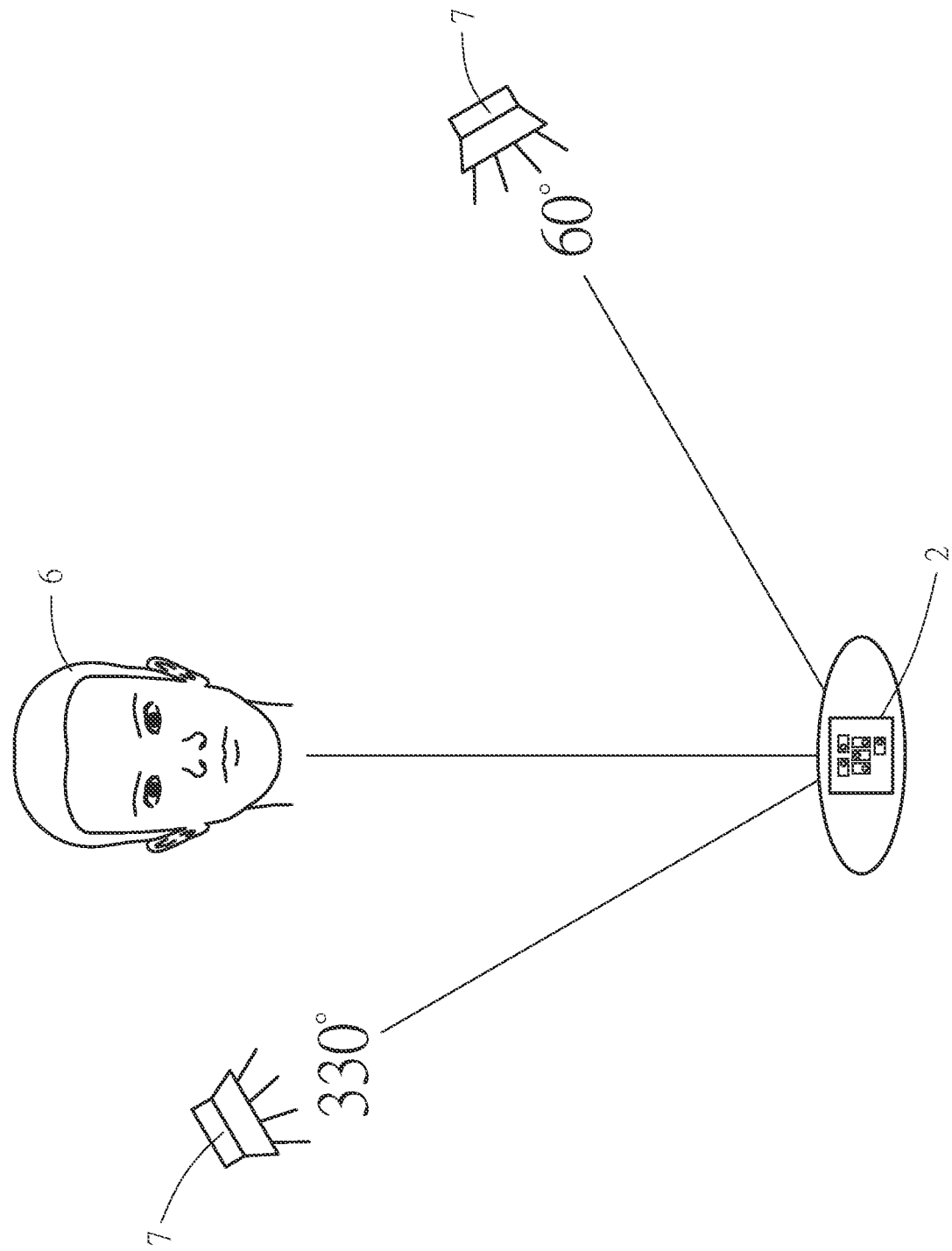
FIG. 9 is a schematic view depicting a test setting wherein the advanced-adaptation-combined DMA algorithm is used to isolate a speaking voice from ambient sounds coming from different angles.
Figure 10:
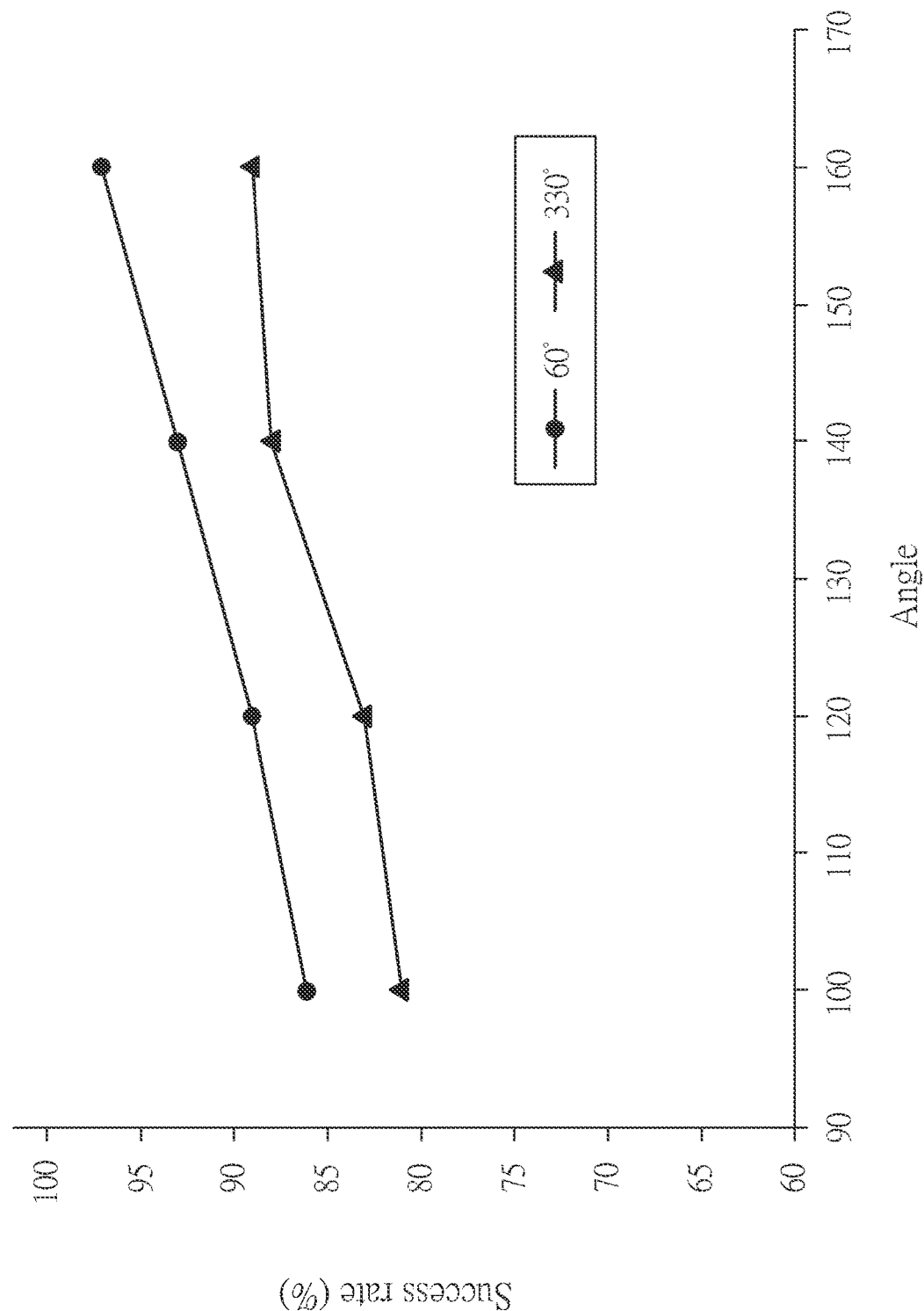
FIG. 10 shows the test results obtained from the test as depicted in FIG. 9, exhibiting the success rates at which the microphone chips isolate the speaking voice from the 330- and 60-degree ambient sounds at different distances.

Referring to FIG. 9 and FIG. 10, another test was performed to evaluate the ability of the 360-degree acoustic-receiving unit 2 to isolate speaking voices of a speaking object 6 from ambient sounds of noise sources 7 at different sites when the human-face image is no more useful for the apparatus to focus on the speaking voice due to angular deflection. The speaking object 6 was set at the 0-degree azimuth wither respect to the 360-degree acoustic-receiving unit 2, and the two noise sources 7 were set at the 60-degree azimuth and the 330-degree azimuth with respect to the 360-degree acoustic-receiving unit 2. The speaking object 6 and the noise sources 7 were equidistant to the 360-degree acoustic-receiving unit 2. FIG. 10 shows the success rates for detecting speaking voices when the speaking object 6 and the noise sources 7 were separated from the 360-degree acoustic-receiving unit 2 by 100 cm, 120 cm, 140 cm, and 160 cm. Therein, the success rates for voice detection obtained at the 60-degree azimuth were 86% at 100 cm, 89% at 120 cm, 93% at 140 cm, and 97% at 160 cm. the success rates for voice detection obtained at the 330-degree azimuth were 81% at 100 cm, 83% at 120 cm, 88% at 140 cm, land 89% at 60 cm. The results of the test demonstrate that the 360-degree acoustic-receiving unit 2 of the present embodiment is effective in isolating speaking voices from ambient sounds.

Figure 11:
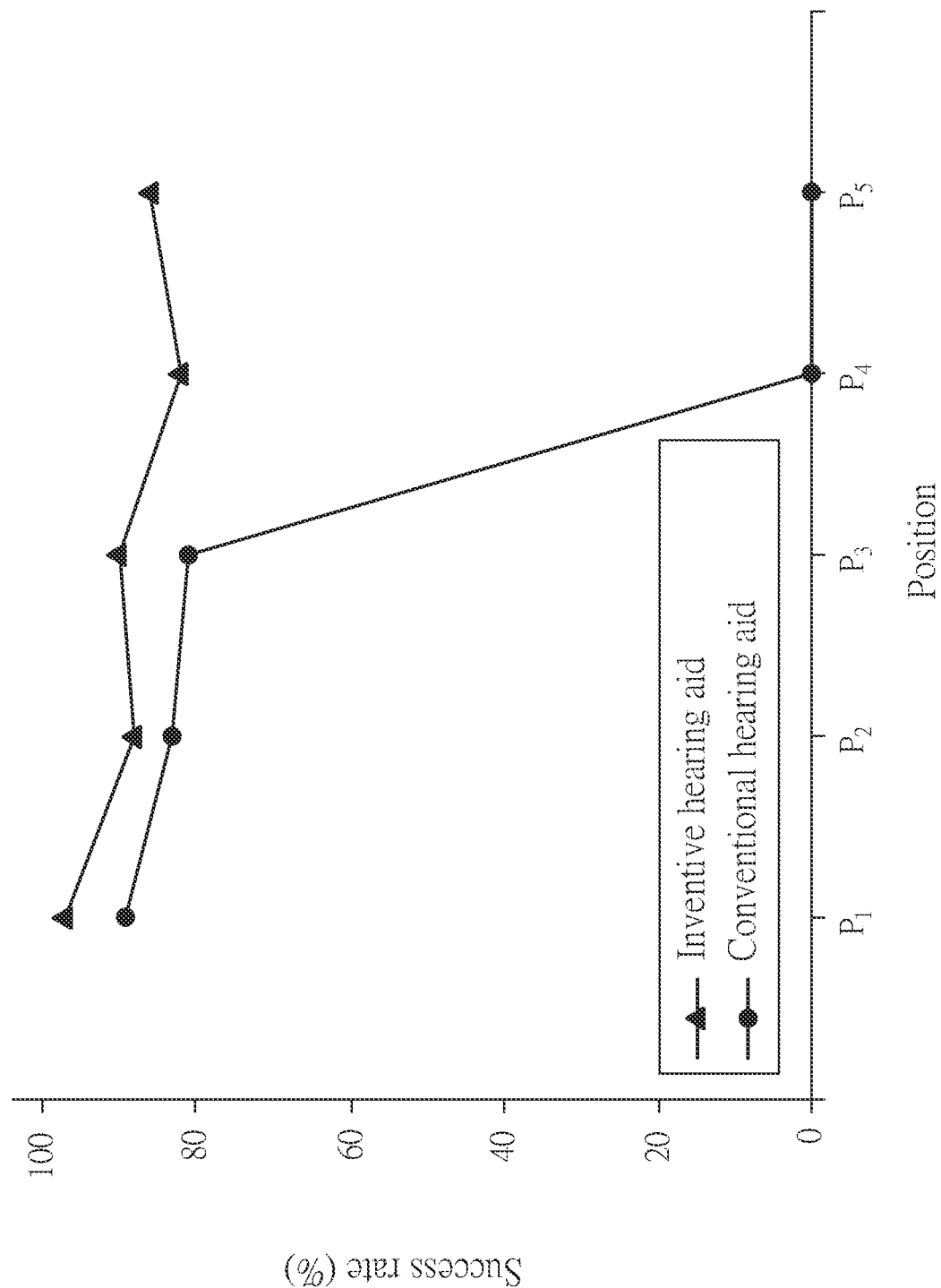
FIG. 11 compares the success rates at which the hearing aiding apparatus of the present invention and a conventional hearing isolate speaking voices from different azimuths.

Referring to FIG. 11, the hearing aiding apparatus of the present embodiment effectively focused on speaking voices from the front P1 of the user, from the front left P2 at the 30-degree azimuth, from the front right P3 at the 30-degree azimuth, from the rear left P4 at the 30-degree azimuth, and from the rear right at the 30-degree azimuth, whereas the tested conventional hearing aid failed to focus on the speaking voice coming from the back of the user.

Figure 12:
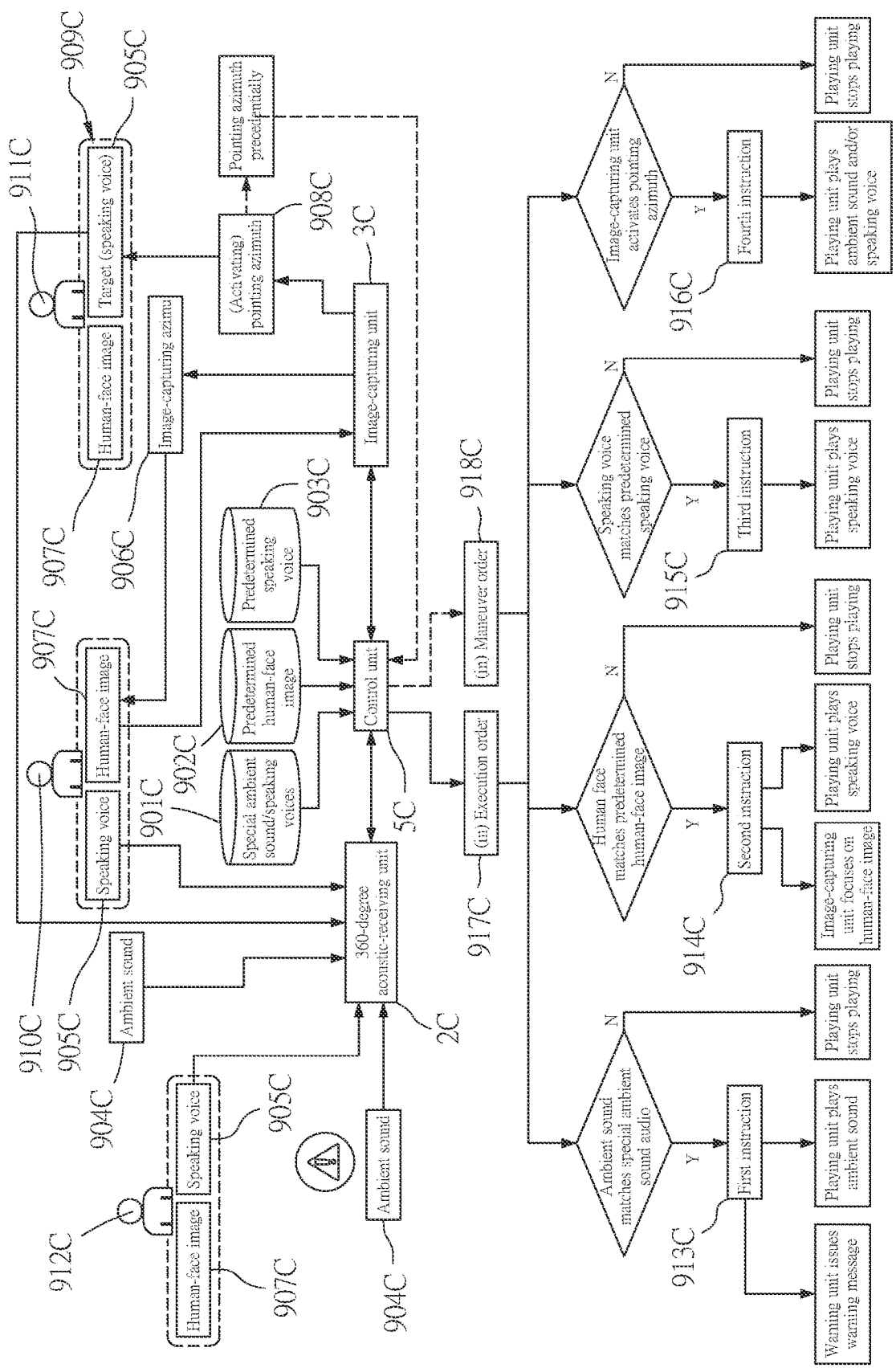
FIG. 12 is a flowchart of operation of the hearing aiding method integrating image-acoustics positioning ability, omnidirectional acoustic reception according to the present invention.

Referring to FIG. 12, the present invention also provides a hearing aiding method integrating image-acoustics positioning ability, omnidirectional acoustic reception, which comprises the following steps.

The first step is to store a plurality of special ambient sound audios 901C, a plurality of predetermined human-face images 902C, and a plurality of predetermined speaking voices 903C in a storage unit as the samples for comparison. Therein, the special ambient sound audios 901C may include an ambulance's siren sound, a car's horn sound, a fire-fighting truck's siren sound, and a patrol car's siren sound. The predetermined human-face images 902C may include human-face images of individuals who frequently talk to the user, and for each of the individuals, plural human-face images taken from different shooting angles or presenting different facial expression may be included. The predetermined speaking voices 903C may include audio clips of speaking voices of individuals who frequently talk to the user and of normal interlocutors.

The method then involves using the 360-degree acoustic-receiving unit 2C to continuously collect an ambient sound 904C and a speaking voice 905C, and using the image-capturing unit 3C to capture a human-face image 907C at a variable image-capturing azimuth 906C or point a target 909C with a pointing azimuth 908C. The image-capturing azimuth 906C is the direction of image-capturing unit 3C when capturing images. The image-capturing azimuth 906C is controlled by the user. The user thus can point the image-capturing azimuth 906C to the object 910C participating in the conversation by controlling the direction of the image-capturing unit 3C. In FIG. 12, three objects 910C, 911C, 912C are shown. The object 910C is, for example, a familiar, for whom the corresponding human-face image and speaking voice have been pre-stored in the storage unit. The object 911C is, for example, a stranger, for whom no human-face image and speaking voice have been stored in the storage unit. The object 912C is, for example, another familiar, for whom the corresponding human-face image and speaking voice have been pre-stored in the storage unit. In the embodiment, the user has conversation with the two familiars and the stranger. The pointing azimuth 908C refers to the azimuth the image-capturing unit 3C is pointed to during the period when the image-capturing unit 3C is manually stropped from shooting. The pointing azimuth 908C is controlled by the user. The target 909C refers to a source of a sound or a voice, such as a person or an animal. In the present embodiment, the target 909C is the speaking voice 905C. of the stranger object 911C The control unit 5C then compares the ambient sound 904C to the special ambient sound audios 901C, and generates a first instruction 913C when a match is found. In the present embodiment, some ambient sound 904C is an ambulance's siren sound. The 360-degree acoustic-receiving unit 2C captures the ambulance's siren sound in a real-time manner, and the control unit 5C compares the ambient sound 904C to the pre-stored special ambient sound audios 901C. When it is determined that the ambient sound 904C matches one of the special ambient sound audios 901C, the control unit 5C generates a first instruction 913C accordingly.

The control unit 5C compares the human-face image 907C to the predetermined human-face image 902C, and generates a second instruction 914C when a match is found. In a conversation scenario where a user talks to three individuals, objects 910C, 912C are the user's familiars and their data are incorporated in the predetermined human-face images 902C, while the object 911C is a stranger to the user, so the predetermined human-face images 902 do not contain his data. During their conversation, the faces of the three objects 910C, 911C, 912C are all captured by the image-capturing unit 3C, but the second instruction 914C is only generated when the human-face images 907C of the objects 910C, 912C are captured.

The control unit 5C compares the speaking voices 905C to the predetermined speaking voices 903C, and generates a third instruction 915C when a match is found. Among the three conversation objects 910C, 911C, 912C, only the object 910C and the object 912C are contained in the predetermined human-face images 902C, and no datum is available for the object 911C. Therefore, the 360-degree acoustic-receiving unit 2C only generates the third instruction 915C when it captures the speaking voices 905C of the objects 910C, 912C.

The image-capturing unit 3C activates the pointing azimuth 908C to generate a fourth instruction 916C. The user can control the image-capturing unit 3C to stop capturing the human-face image 907C anytime. In this case, the pointing direction of the optical axis of the lens of the image-capturing unit 3C can still be transmitted to the control unit 5C. For example, it may be transmitted as a message transmitted by a direction sensor built in the image-capturing unit 3C. The pointing direction of the optical axis of the lens of the image-capturing unit 3C at this time is the pointing azimuth 908C as described previously. The control unit 5C, with the knowledge of the pointing azimuth 908C of the image-capturing unit 3C, is thus able to make the 360-degree acoustic-receiving unit 2C screen out the speaking voice 905C corresponding the pointing azimuth 908C.

The first instruction 913C is to instruct the playing unit to display the present ambient sound 904C and generates a warning message. During conversation, normal ambient sounds 904C such as wind sound and noise will be filtered out, so as to focus the user on the interlocutor's voices 905C. Nevertheless, any ambulance siren sound can trigger the first instruction 913C, so the playing unit is instructed to play the ambulance siren sound, and the warning unit starts to vibrate to warn the user. At this time, the speaking voices 905C in the conversation is temporarily muted to a certain extent or to silences.

The second instruction 914C is to instruct the image-capturing unit 3C to focus on the human-face image 907C, and instruct the playing unit to play the speaking voice 905C coming from the image-capturing azimuth 906C. In the present embodiment, the image-capturing azimuth 906C of the image-capturing unit 3C points to the object 910C who is talking to and facing the user. At this time, the image-capturing unit 3C focuses on the human-face image 907C of the object 910C, and the playing unit plays the speaking voice 907C of the object 910C. In this stage, even if the other two objects 911C,912C are talking to each other, their speaking voices are not played by the playing unit. Meanwhile, if the two objects 910C,912C familiar with the user speak at the same time, since the object 910C is closer to the image-capturing azimuth 906C than the object 912C, which implies that the user is currently pay more attention to the object 910C, the apparatus precedentially selects the object 910C as the current interlocutor. During conversation, if there is not any captured human-face image 907C matching any of the predetermined human-face images 902C, the playing unit is instructed, through the second instruction 914C, to play the speaking voice 905C that is closest to the pointing azimuth 908C. During conversation, if there are two or more speaking voices 905C matching the predetermined speaking voices 903C, the playing unit is instructed, through the second instruction 914C, to play the speaking voice closest to the pointing azimuth 908C.

The third instruction 915C is to instruct the playing unit to play the speaking voice 905C matching the predetermined speaking voice 903C. When the object 910C is having conversation with the user and the image-capturing unit 3C fails to capture a complete human-face image 907C of the object 910C because, for example, the object 910C is wearing a mask or facing the user sideways, since the speaking voice 905C of the object 910C matches one of the predetermined speaking voices 903C, the playing unit is instructed, through the third instruction 915C, to play the speaking voice 905C of the object 910C. Alternatively, when the interlocutor is an acquaintance whose data have not been stored as a part of the predetermined human-face images 902C but have been stored as a part of the predetermined speaking voices 903C, the playing unit t is instructed, through the third instruction 915C, to play the speaking voice 905C of the acquaintance during conversation.

The fourth instruction 916C instructs the playing unit to play the ambient sound 904C and/or the speaking voice 905C at the pointing azimuth 908C. By doing so, the user has the initiative to control the acoustic-receiving direction and can focus the image-capturing unit 3C on pointing by deactivating the image-capturing unit 3C from capturing human faces anytime. The image-capturing unit 3C changes the pointing azimuth 908C to point a target 909C, so that, in response to the fourth instruction 916C, the playing unit plays a worth-noting ambient sound 904C or a stranger's voice 905C coming from the pointing azimuth 908C.

The first instruction 913C, the second instruction 914C, the third instruction 915C, and the fourth instruction 916C are executed in an execution order 917C or in a maneuver order 918C. Therein, according to the execution order 917C, the first instruction 913C is prior to the second instruction 914C; the second instruction 914C is prior to the third instruction 915C; and the third instruction 915C is prior to the fourth instruction 916C. According to the maneuver order 918C, the first instruction 913C has the top priority while the fourth instruction 916C is prior to both the second and third instructions 914C, 915C.

When at least two of the first instruction 913C, the second instruction 914C, the third instruction 915C, and the fourth instruction 916C exist, the control unit 5C executes the existing ones of the first instruction 913C, the second instruction 914C, the third instruction 915C, and the fourth instruction 916C in the execution order 917C or in the maneuver order 918C.

When only one of the first instruction 913C, the second instruction 914C, the third instruction 915C, and the fourth instruction 916C exists, the control unit 5C only executes the existing one of the first instruction 913C, the second instruction 914C, the third instruction 915C, and the fourth instruction 916C.

According to the execution order 917C, a familiar's speaking voice 905C is precedentially selected to play, and an acquaintance's speaking voice 905C is selected to play prior to a stranger's speaking voice 905C. By contrast, the maneuver order 918C allows the user to customize the priority among familiars, acquaintances, and strangers in terms of playing the speaking voice 905C. However, a warning ambient sound 904C is always of the top prior and played precedentially whether it is in the execution order 917C or in the maneuver order 918C.

With the method and the apparatus of the present invention, the hearing aiding process is performed even more smartly and the user can be timely prompted of any warning sounds appearing in the environment. When the method and the apparatus of the present invention are used in a classroom, they can help focus the user as a student on a teacher's voices by blocking out environmental noises, so as to facilitate concentrative learning.

The description of the foregoing embodiments has been made for helping comprehend the operation, use, and effects of the present invention.

However, the embodiments described herein are some of preferred embodiments of the present invention and form no limitation to the scope of the present invention. In particular, all equivalent changes or modifications of these and other embodiments which do not depart from the concept of the present invention should be encompassed by the appended claims.

What is claimed is:

1. A hearing aiding apparatus integrating image-acoustics positioning, omnidirectional acoustic reception, and warning, the apparatus comprising:
   an apparatus body, provided with a playing unit;
   a 360-degree acoustic-receiving unit, provided in the apparatus body, the 360-degree acoustic-receiving unit comprising six arrayed microphone chips, each of the microphone chips defending an acoustic-receiving zone, any two of the acoustic-receiving zones connected by an imaginary line that is located on an acoustic-receiving line corresponding to 0 degree, 60 degrees, 90 degrees, 120 degrees, 150 degrees, 180 degrees, 210 degrees, 240 degrees, 270 degrees, 300 degrees, and 380 degrees with respect to a front of the 360-degree acoustic-receiving unit, for the 360-degree acoustic-receiving unit to capture an audio signal around the apparatus body, the audio signal including an ambient sound and a speaking voice;
   an image-capturing unit, provided in the apparatus body, the image-capturing unit capturing a human-face image in an image-capturing azimuth around the apparatus body, or pointing a target around the apparatus body in a pointing azimuth;
   a warning unit, provided in the apparatus body;
   a control unit, storing at least one predetermined human-face image, at least one predetermined speaking voice, and at least one special ambient sound audio, the control unit being in signal communication with the playing unit, the 360-degree acoustic-receiving unit, the image-capturing unit, and the warning unit, the control unit receiving the audio signal and the human-face image, when the human-face image matches any of the predetermined human-face image, the control unit using a second instruction to instruct the image-capturing unit to focus on the human-face image, and controlling the 360-degree acoustic-receiving unit to continuously capture the speaking voice at the image-capturing azimuth according to the image-capturing azimuth, and the playing unit playing the speaking voice; when there is not the human-face image, or the human-face image does not match the predetermined human-face image, if the speaking voice matches any of the predetermined speaking voice, the control unit using a third instruction to instruct the playing unit to play the speaking voice matching the predetermined speaking voice; when there is not the human-face image, or the human-face image does not match the predetermined human-face image, and the speaking voice does not match the predetermined speaking voice, the control unit controlling the 360-degree acoustic-receiving unit to continuously capture the ambient sound and/or the speaking voice at the pointing azimuth according to the pointing azimuth, and controlling the playing unit to play the ambient sound and/or the speaking voice; the control unit further controlling the 360-degree acoustic-receiving unit to keep capturing the ambient sound all around the apparatus body, the control unit determining whether the ambient sound is contained in the special ambient sound audio through comparison, and when the ambient sound is contained in the special ambient sound audio, the control unit precedentially displaying the ambient sound, and interrupting or reducing the speaking voice, and the control unit also controlling the warning unit to issue a warning message in a real-time manner.

2. The hearing aiding apparatus of claim 1, wherein the six acoustic-receiving zones are arranged into three columns in the 360-degree acoustic-receiving unit, the first column having the first acoustic-receiving zone and the second acoustic-receiving zone that are arranged in a line, the second column having the third acoustic-receiving zone, the fourth acoustic-receiving zone, and the fifth acoustic-receiving zone offset that are each offset from an adjacent counterpart or adjacent counterparts thereof, and the third column having a sixth acoustic-receiving zone; therein, the acoustic-receiving line formed by the fifth acoustic-receiving zone and the sixth acoustic-receiving zone being in a 0- and 180-degree azimuth, the acoustic-receiving line formed by the second acoustic-receiving zone and the fourth acoustic-receiving zone being in a 30- and 210-degree azimuth, the acoustic-receiving line formed by the third acoustic-receiving zone and the fourth acoustic-receiving zone being in a 60- and 240-degree azimuth, the acoustic-receiving line formed by the first acoustic-receiving zone and the second acoustic-receiving zone being in a 90- and 270-degree azimuth, the acoustic-receiving line formed by the fourth acoustic-receiving zone and the fifth acoustic-receiving zone being in a 120- and 300-degree azimuth, and the acoustic-receiving line formed by the first acoustic-receiving zone and the fourth acoustic-receiving zone being in a 150- and 330-degree azimuth.

3. The hearing aiding apparatus of claim 2, wherein when the human-face image is no more useful for the apparatus to focus on the speaking voice at the image-capturing azimuth due to angular deflection, the control unit uses an advanced-adaptation-combined differential microphone array (DMA) algorithm to focus on a loudest human speaking voice as the speaking voice, and to isolate the speaking voice and the ambient sound from the audio signal.

4. The hearing aiding apparatus of claim 3, wherein the advanced-adaptation-combined DMA algorithm is represented by:
$S_m(t) = h_m^T Q(t) + U_m(t)$, where $S_m(t)$ denotes the audio signal received by the $m^{th}$ microphone chip; $Q(t)=$ $[q(t) \ldots q(t-K_g+1)]^T$ denotes an impulse response of the speaking voice to the $m^{th}$ microphone chip, presented as a set of column vectors of $K_g$ samples of zero-mean signals; $h_m=[h_{m,1} \ldots h_{m,K_g}]$ denotes the column vector of the sample $K_g$; $U_m(t)$ denotes the ambient sound in the audio signal, and T is a transpose operator, whereby the advanced-adaptation-combined DMA algorithm calculates the audio signals received by the $m_a^{th}$ microphone chip and by the $m_{a+1}^{th}$ microphone chip; the microphone chip having pointing pattern that is defined by a zero-point deflection angle $\theta_0$, and the angle is determined by a distance $d_k$ and a delay time $\tau_k$ between the microphone chips, represented by: $\theta_0=\cos^{-1}(-c\tau_k/d_k)$, where c denotes a speed of sound; the pointing pattern being of a cardioid pattern ($\theta_0=180$, $\tau_k=d_k/c$), so that frequency response is obtained using a compensating factor $$h_k = \frac{1}{1-\exp(-j2\omega\tau_k)}.$$

5. The hearing aiding apparatus of claim 1, wherein the image-capturing unit comprises two cameras, and the two cameras are located at opposite, front and rear ends of the neck-worn portion, respectively.

6. The hearing aiding apparatus of claim 1, wherein the warning unit comprises two vibrators, and the two vibrators are located at opposite, left and right sides of the neck-worn portion, respectively.

7. The hearing aiding apparatus of claim 6, wherein the control unit identifies an azimuth of the ambient sound through the 360-degree acoustic-receiving unit, and the control unit separately controls one of the vibrators corresponding to the azimuth of the ambient sound to vibrate.

8. The hearing aiding apparatus of claim 1, wherein the apparatus body comprises two ear-worn portions and a neck-worn portion, in which the 360-degree acoustic-receiving unit and the image-capturing unit are provided in the neck-worn portion, while the warning unit and the playing unit are provided in the two ear-worn portions.

9. The hearing aiding apparatus of claim 1, wherein the apparatus body comprises two ear-worn portions and a head-worn portion, in which the 360-degree acoustic-receiving unit and the image-capturing unit are provided in the head-worn portion, while the warning unit and the playing unit are provided in the two ear-worn portions.

10. The hearing aiding apparatus of claim 1, wherein the apparatus body comprises two ear-worn portions and a pendant portion in wireless connection, and the pendant portion is provided with a detachable lanyard, in which the 360-degree acoustic-receiving unit and the image-capturing unit are provided in the pendant portion, while the warning unit and the playing unit are provided in the two ear-worn portions.

* * * * *